US010141972B2

(12) United States Patent
Kwon et al.

(10) Patent No.: US 10,141,972 B2
(45) Date of Patent: Nov. 27, 2018

(54) TOUCH SCREEN CONTROLLER FOR INCREASING DATA PROCESSING SPEED AND TOUCH SYSTEM INCLUDING THE SAME

(71) Applicant: SAMSUNG ELECTRONICS CO., LTD., Suwon-si (KR)

(72) Inventors: Hyung-Dal Kwon, Hwaseong-si (KR); Gyeong Min Ha, Hwaseong-si (KR); Ho-Suk Na, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/393,501

(22) Filed: Dec. 29, 2016

(65) Prior Publication Data

US 2017/0214425 A1    Jul. 27, 2017

(30) Foreign Application Priority Data

Jan. 26, 2016    (KR) .................. 10-2016-0009673
Jun. 3, 2016    (KR) .................. 10-2016-0069664

(51) Int. Cl.
| H04B 1/40 | (2015.01) |
| H04B 1/401 | (2015.01) |
| H04L 12/40 | (2006.01) |
| H04B 7/26 | (2006.01) |
| G06F 3/041 | (2006.01) |

(52) U.S. Cl.
CPC .......... *H04B 1/401* (2013.01); *G06F 3/0416* (2013.01); *H04B 7/2656* (2013.01); *H04L 12/40* (2013.01)

(58) Field of Classification Search
CPC ..... H04B 1/401; H04B 17/2656; H04L 12/40; H04L 47/30; G06F 3/0416; G06F 9/3004; G06F 9/30098; G06F 9/50; G06F 9/544
See application file for complete search history.

(56) References Cited

U.S. PATENT DOCUMENTS

| 7,999,793 B2 | 8/2011 | Wang |
| 8,988,360 B2 | 3/2015 | Takahashi et al. |
| 2007/0159467 A1 | 7/2007 | Kim et al. |
| 2010/0265211 A1 | 10/2010 | Oishi et al. |

(Continued)

FOREIGN PATENT DOCUMENTS

| KR | 100875118 B1 | 12/2008 |
| KR | 101105447 B1 | 1/2012 |
| KR | 1020120093515 A | 8/2012 |

*Primary Examiner* — Nhan Le
(74) *Attorney, Agent, or Firm* — Sughrue Mion, PLLC

(57) ABSTRACT

A touch screen controller (TSC) includes: a front end circuit configured to send a control signal to a touch panel and to receive a touch signal from the touch panel; an algorithm processing circuit configured to process source data generated based on the touch signal according to a predetermined algorithm; a memory configured to store the source data and result data obtained as a result of processing the source data at the algorithm processing circuit; and a bus configured to transfer data among the front end circuit, the algorithm processing circuit, and the memory. The algorithm processing circuit includes: a buffer configured to temporarily store the source data or the result data and shared by at least two circuits; and a special function register (SFR) configured to store a setting value necessary for an operation of the algorithm processing circuit.

17 Claims, 27 Drawing Sheets

(56) References Cited

U.S. PATENT DOCUMENTS

| | | |
|---|---|---|
| 2014/0015768 A1 | 1/2014 | Karpin et al. |
| 2014/0310721 A1* | 10/2014 | Chew .................. G06F 9/50 |
| | | 718/104 |
| 2014/0316729 A1 | 10/2014 | Kremin et al. |
| 2015/0049034 A1 | 2/2015 | Post et al. |
| 2015/0109227 A1 | 4/2015 | Shin et al. |
| 2015/0130613 A1* | 5/2015 | Fullam ............ G08B 21/0453 |
| | | 340/539.12 |
| 2015/0185951 A1 | 7/2015 | Akai et al. |

\* cited by examiner

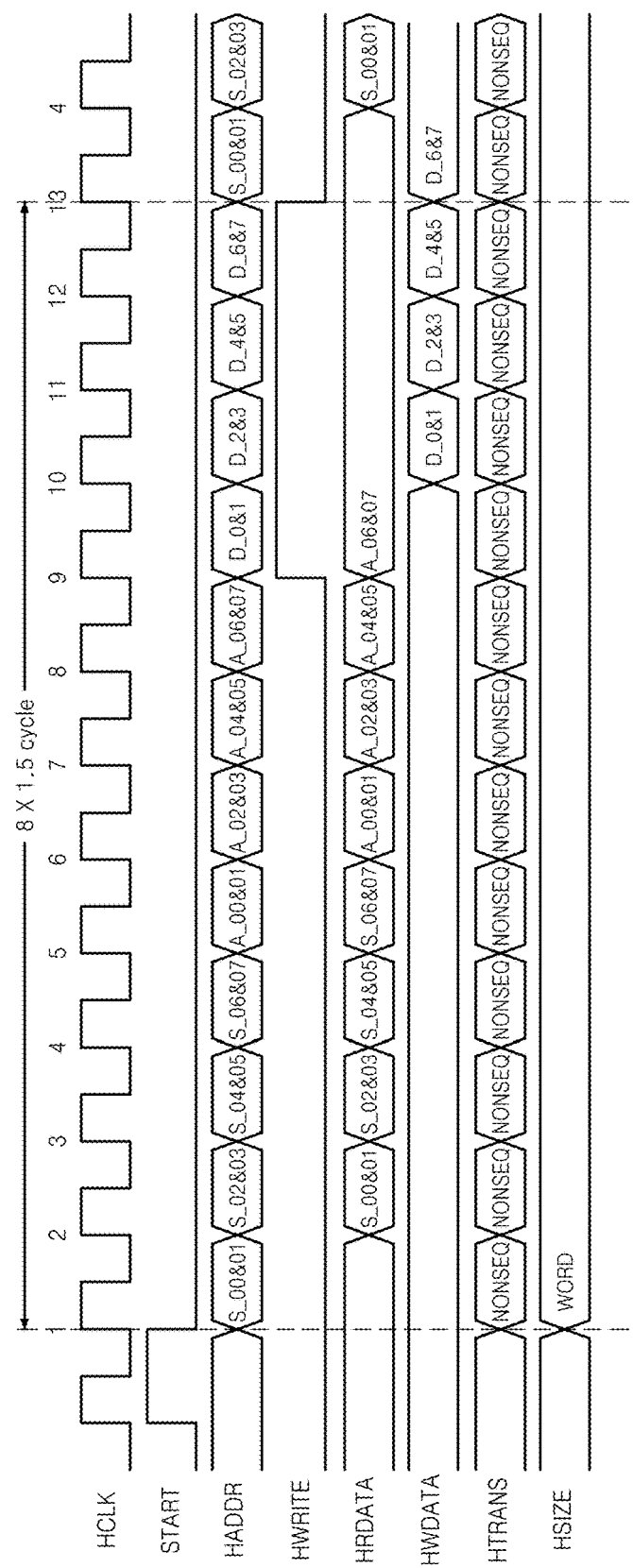

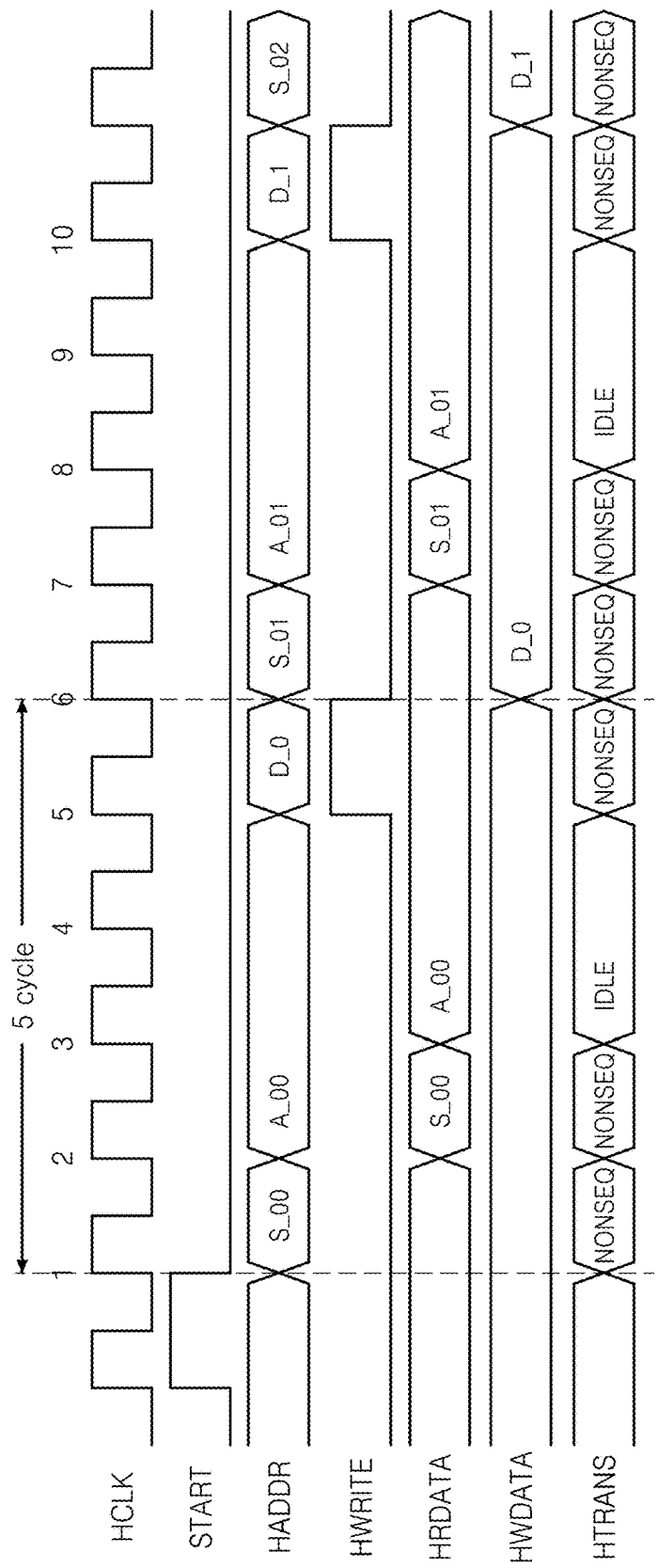

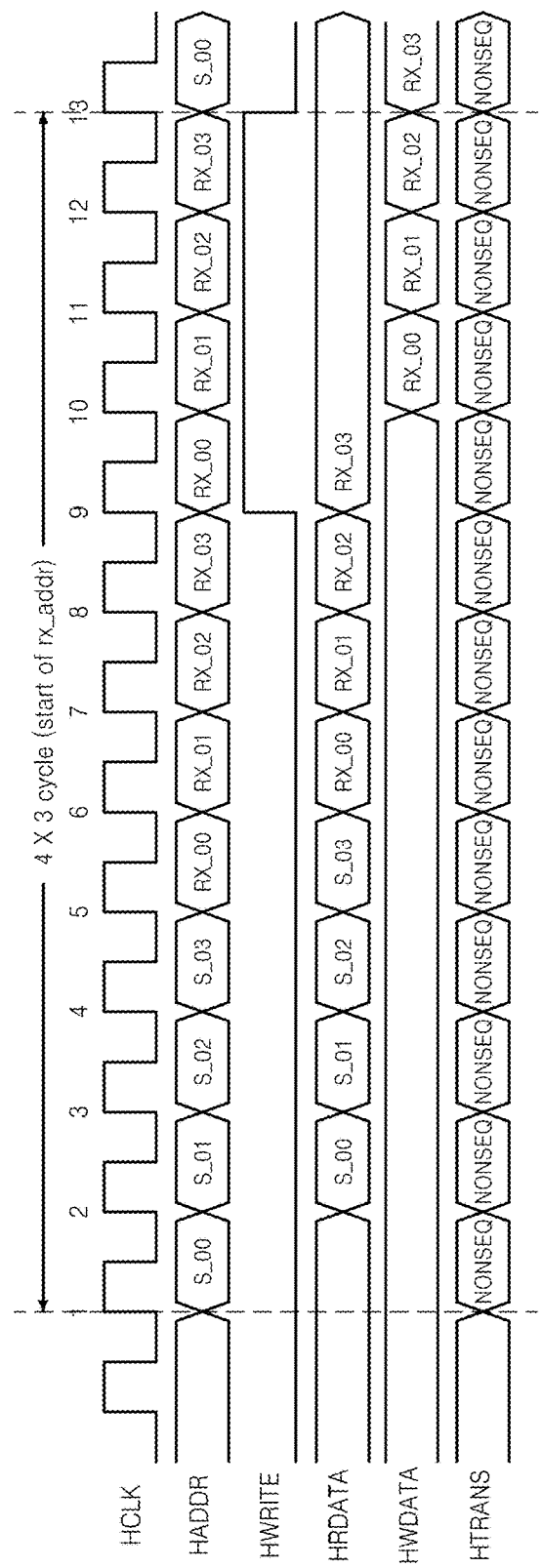

FIG. 23

|  | | #0 | #1 | #2 | #3 | #4 | #5 | #6 | #7 |
|---|---|---|---|---|---|---|---|---|---|
| source | data | 60 | 62 | 68 | 74 | 80 | 114 | 154 | 90 |
| #0 | 60 | 0 | 2 | 8 | 14 | 20 | 54 | 94 | 30 |
| #1 | 62 | 2 | 0 | 6 | 12 | 18 | 52 | 92 | 28 |
| #2 | 68 | 8 | 6 | 0 | 6 | 12 | 46 | 86 | 22 |
| #3 | 74 | 14 | 12 | 6 | 0 | 6 | 40 | 80 | 16 |
| #4 | 80 | 20 | 18 | 12 | 6 | 0 | 34 | 74 | 10 |
| #5 | 114 | 54 | 52 | 46 | 40 | 34 | 0 | 40 | 24 |
| #6 | 154 | 94 | 92 | 86 | 80 | 74 | 40 | 0 | 64 |
| #7 | 90 | 30 | 28 | 22 | 16 | 10 | 24 | 64 | 0 |
| H_CNT | | 4 | 4 | 5 | 5 | 4 | 1 | 1 | 2 |
| Seleted Data | | 60 | 62 | 68 | 74 | 80 | 0 | 0 | 0 |
| AC_DAT | | | | | | | | | 344 |
| AC_CNT | | | | | | | | | 5 |
| Loffset | | | | | | | | | 68.8 |

TOUCH SCREEN CONTROLLER FOR INCREASING DATA PROCESSING SPEED AND TOUCH SYSTEM INCLUDING THE SAME

CROSS-REFERENCE TO THE RELATED APPLICATIONS

This application claims priority under 35 U.S.C. § 119(a) from Korean Patent Application Nos. 10-2016-0009673 filed on Jan. 26, 2016, and 10-2016-0069664 filed on Jun. 3, 2016, the disclosures of which are hereby incorporated by reference in their entirety.

BACKGROUND

Apparatus and methods consistent with exemplary embodiments of the inventive concept relate to a touch screen controller, a system including the same, operating the same.

A touch screen controller (TSC) may have scan speed of about 120 Hz to allow a user to smoothly handwrite on a touch screen. A signal input to the TSC from a touch panel includes various types of noise (such as fluorescent light, static electricity, charger, electromagnetic waves, and display) apart from a touch signal. Accordingly, the TSC uses various kinds of analog filters, digital filters, and software algorithms to filter out noise to obtain a pure finger touch signal. The more filters and algorithms are used, the slower a touch signal processing speed. As a result, response speed performance deteriorates. In particular, using a software algorithm leads to more decrease in the processing speed as compared to using a hardware filter, thereby becoming the main cause of performance deterioration.

SUMMARY

According to an exemplary embodiment of the inventive concept, there is provided a touch screen controller (TSC) which may include: a front end circuit configured to send a control signal to a touch panel and to receive a touch signal from the touch panel; an algorithm processing circuit configured to process source data generated based on the touch signal according to a predetermined algorithm; a memory configured to store the source data and result data obtained as a result of processing the source data at the algorithm processing circuit; and a bus configured to transfer data among the front end circuit, the algorithm processing circuit, and the memory. Here, the algorithm processing circuit may include: a common buffer configured to temporarily store the source data or the result data and shared by at least two circuits for efficient use of resources; and a special function register (SFR) configured to store a setting value necessary for an operation of the algorithm processing circuit.

According to an exemplary embodiment of the inventive concept, there is provided a touch screen controller which may include: a front end circuit configured to send a control signal to a touch panel and to receive a touch signal from the touch panel; an algorithm processing circuit configured to process source data generated based on the touch signal according to a predetermined algorithm; a memory configured to store the source data and result data obtained as a result of processing the source data at the algorithm processing circuit; and a bus configured to transfer data among the front end circuit, the algorithm processing circuit, and the memory. Here, the front end circuit may include: an analog-to-digital converter to output the source data in a unit of Q-bit, where Q is a natural number of at least 2; and a memory controller configured: to extend the Q-bit source data to a size of a divisor of a bandwidth of the bus, the divisor being greater than Q and less than or equal to the bandwidth of the bus, by adding a sign bit to a most significant bit of the Q-bit source data one more times; and to output the extended Q-bit source data to the bus.

According to an exemplary embodiment of the inventive concept, there is provided a touch system which may include: a TSC configured to send a control signal to a touch panel, to receive a touch signal from the touch panel, and to process the touch signal and an application processor configured to receive a processing result signal from the TSC. Here, the TSC may include: an algorithm processing circuit configured to process source data generated based on the touch signal according to a predetermined algorithm, a memory configured to store the source data and result data obtained as a result of processing the source data at the algorithm processing circuit, and a bus configured to transfer data between the algorithm processing circuit and the memory. Here, a bit size of source data corresponding to a single pixel may be less than a bandwidth of the bus, and the algorithm processing circuit may read at least two source data from the memory in accordance with the bandwidth of the bus.

BRIEF DESCRIPTION OF THE DRAWINGS

The above and other features of the inventive concept will become more apparent by describing in detail exemplary embodiments thereof with reference to the attached drawings in which:

FIG. 6A is a schematic timing chart showing an operation of the ambient remover illustrated in FIG. 5, according to an exemplary embodiment;

FIG. 6B is a schematic timing chart showing an operation of the ambient remover in a single mode, according to an exemplary embodiment;

FIG. 14A is a timing chart showing an operation of the energy calculator according to an exemplary embodiment;

FIG. 23 is a diagram for explaining a procedure in which the display noise filter obtains display noise in one line when there are eight column channels, according to an exemplary embodiment;

DETAILED DESCRIPTION OF THE EXEMPLARY EMBODIMENTS

A response time to a touch is one factor to measure performance of a touch screen controller (TSC). The more complicated an algorithm used in the TSC, the longer the response time. In order to address this problem, a software algorithm may be implemented in hardware. When the software algorithm is implemented in hardware, more hardware components may be required, incurring an increase of costs, and update may be more difficult. However, an algorithm processing time (i.e., a data processing time) may be significantly reduced, so that the response time may be decreased. As a result, current consumption may also be reduced.

<Structure of a Touch System>

Figure 1:
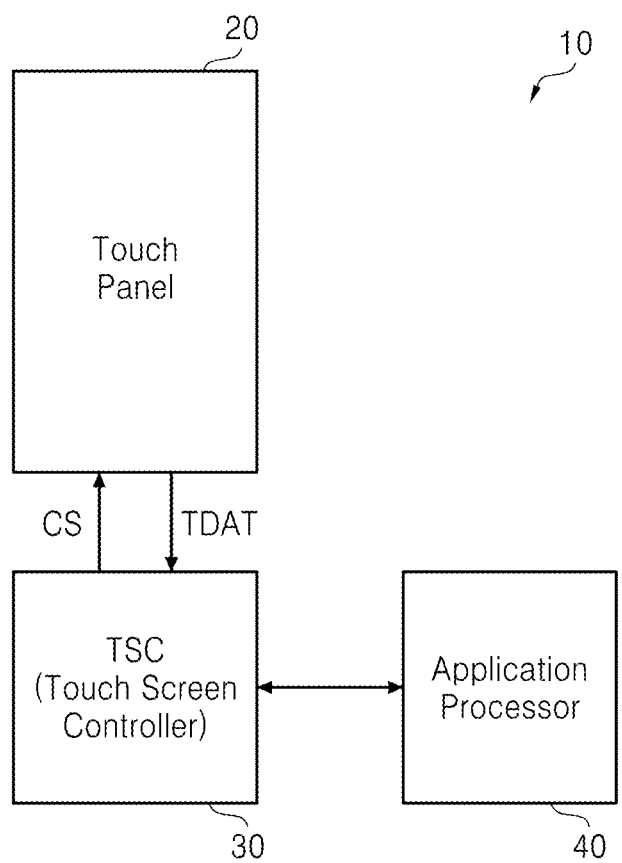
FIG. 1 is a block diagram of a touch system, according to an exemplary embodiment.

FIG. 1 is a block diagram of a touch system 10, according to an exemplary embodiment. The touch system 10 includes a touch panel 20, a TSC 30, and an application processor 40.

The TSC 30 sends a control signal CS to the touch panel 20 and receives touch data TDAT from the touch panel 20. In other words, the TSC 30 exchanges the control signal CS for the touch data TDAT with the touch panel 20. The TSC 30 removes noise from the touch data TDAT received from the touch panel 20 and extracts a touch coordinate and current status through data processing. The TSC 30 sends extraction result values (such as a touch position, status, and moving speed) using an algorithm to the application processor 40 through serial communication such as inter-integrated circuit (I2C).

The TSC 30 processes the touch data TDAT received from the touch panel 20 and calculates and sends a processing result signal (including, for example, an energy peak value, a position of the energy peak value (i.e., a touch position), and a touch range) to the application processor 40.

<Structure of TSC>

Figure 2:
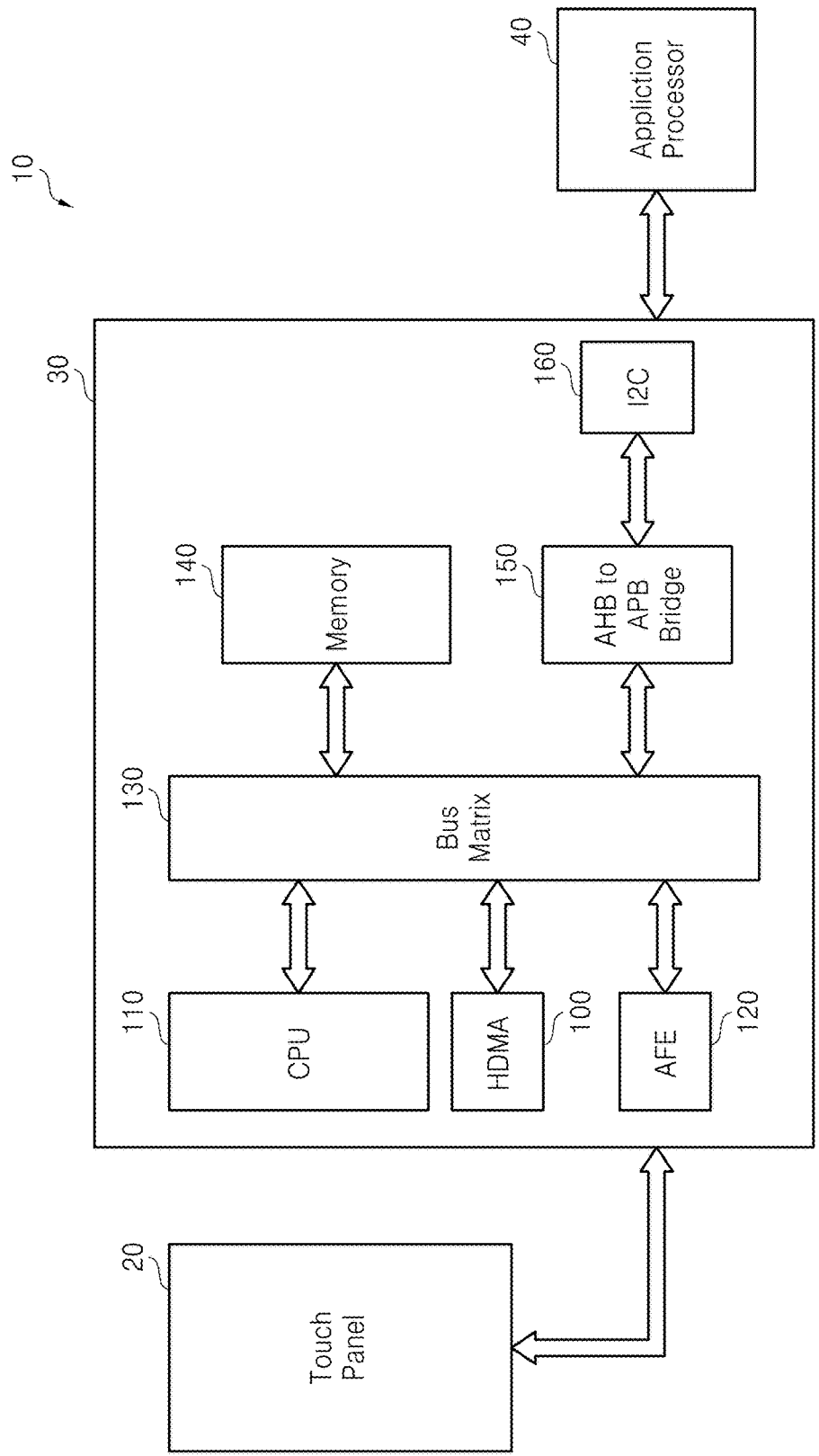
FIG. 2 is a block diagram of a touch screen controller (TSC), according to an exemplary embodiment.

FIG. 2 is a block diagram of the TSC 30, according to an exemplary embodiment. The TSC 30 includes an algorithm processing circuit or HDMA 100, a central processing unit (CPU) 110, an analog front end (AFE) 120, and a bus matrix 130. The TSC 30 may also include a bridge 150 and an I2C 160.

The CPU 110 controls an overall operation of the TSC 30. For instance, the CPU 110 may control an operation of the AFE 120 and an operation of the HDMA 100. The CPU 110 may be referred to as a core and may be implemented using Cortex-M3, but the inventive concept is not restricted to the exemplary embodiment.

The AFE 120 transmits the control signal CS to the touch panel 20 and receives the data signal TDAT from the touch panel 20. The AFE 120 includes a frame buffer to store data received from the touch panel 20.

Although not shown, the AFE 120 may include an analog filter, a power circuit, and an analog-to-digital converter (ADC). The AFE 120 may filter an analog signal received from the touch panel 20 to remove noise and may convert the filtered signal into a digital signal using the ADC. Digital filtering may be performed on the digital signal to remove noise from the digital signal. For instance, the digital signal may be filtered using a finite impulse response (FIR) filter or an infinite impulse response (IIR) filter. A digital filter may be used when noise is not satisfactorily removed using only an analog filter. The digital filter may be implemented at a rear end of the AFE 120 or may be implemented as a separate circuit (i.e., module or unit) within the TSC 30.

The AFE 120 may also multiply data received from the touch panel 20 by a Walsh code, that is, may perform Walsh encoding on the data to obtain amplified source data with noise components removed. Walsh encoding and decoding will be described later.

The AFE 120 may be an advanced high-performance bus (AHB) slave IP but is not restricted thereto. In other exemplary embodiments, the AFE 120 may be divided into an analog part and a digital part. The digital part of the AFE 120 may be formed within the TSC 30 and the digital part of the AFE 120 may be formed between the TSC 30 and the touch panel 20.

The HDMA 100 is a circuit which processes data generated from the touch panel 20 according to a predetermined algorithm. Different algorithms may be implemented in hardware in the HDMA 100. The HDMA 100 processes data generated from the AFE 120 or data stored in a memory 140.

The memory 140 is a space in which data generated or processed by the HDMA 100 are stored. The memory 140 may be formed of static random access memory (SRAM), but the inventive concept is not restricted to the current embodiments. The memory 140 may be formed of a different type of memory such as dynamic RAM (DRAM) or flash memory. The memory 140 may be an AHB slave IP.

The I2C 160 is a circuit which exchanges touch-related data with the application processor 40.

Elements, components, modules or units constituting the TSC 30 may transmit and receive a control signal, an address, and/or data through the bus matrix (hereinafter, referred to as s "bus") 130. For instance, the HDMA 100, the CPU 110, the AFE 120, the memory 140, and the I2C 160 may communicate with one another through the bus 130.

The bus 130 may have an R-bit bus bandwidth, where R is a natural number of at least 2. For instance, the bandwidth of the bus 130 may be 32 bits, but is not restricted thereto. The bus 130 may be an AHB-lite bus matrix, but is not restricted thereto.

The bridge 150 connects the bus 130 and the I2C 160. The bridge 150 may be an AHB-to-advanced peripheral bus (APB) bridge, but is not restricted thereto.

The TSC 30 may be used in mobile phones having a size of 4 to 6 inches, according to an exemplary embodiment, but the inventive concept is not restricted to the exemplary embodiment. The TSC 30 used in mobile phones having a size of 4 to 6 inches will be described to explain time constraints in the TSC 30. When the touch panel 20 is a mutual capacitance touch panel supporting multi-touch, a sum of row channels and column channels usually adds up to 30 to 60. For instance, when there are 25 row channels and 33 column channels, pixel data corresponding to "the number of row channels*the number of column channels", i.e., 825 (=25*33) pixel touch data are generated in a single frame. A 1-pixel touch data (hereinafter, referred to as a "pixel data") may be 10 to 16 bits. It is assumed that each touch data is 16 bits, according to an exemplary embodiment. Accordingly, a size of a 1-frame buffer is 1650 bytes (i.e., 825 points*16 bits=13,200 bits).

Under this assumption, the TSC 30 may be required to perform data processing on 1,650-byte data many times to eventually calculate a touch position (or coordinate), status, and peak value with respect to a single frame. When the touch panel 20 has a frame rate of 120 Hz, around 8.3 milliseconds are needed for a single frame. In other words, touch data of a single frame needs to be processed within 8.3 milliseconds.

When the TSC 30 processes all touch data using a software algorithm, it would be difficult to satisfy time constraints, or an ultra high-performance processor which can quickly process the software algorithm would be required, which increases costs. However, according to an exemplary embodiment, the TSC 30 processes touch data mainly in hardware using the HDMA 100 with a new design, thereby quickly processing the touch data.

Figure 3:
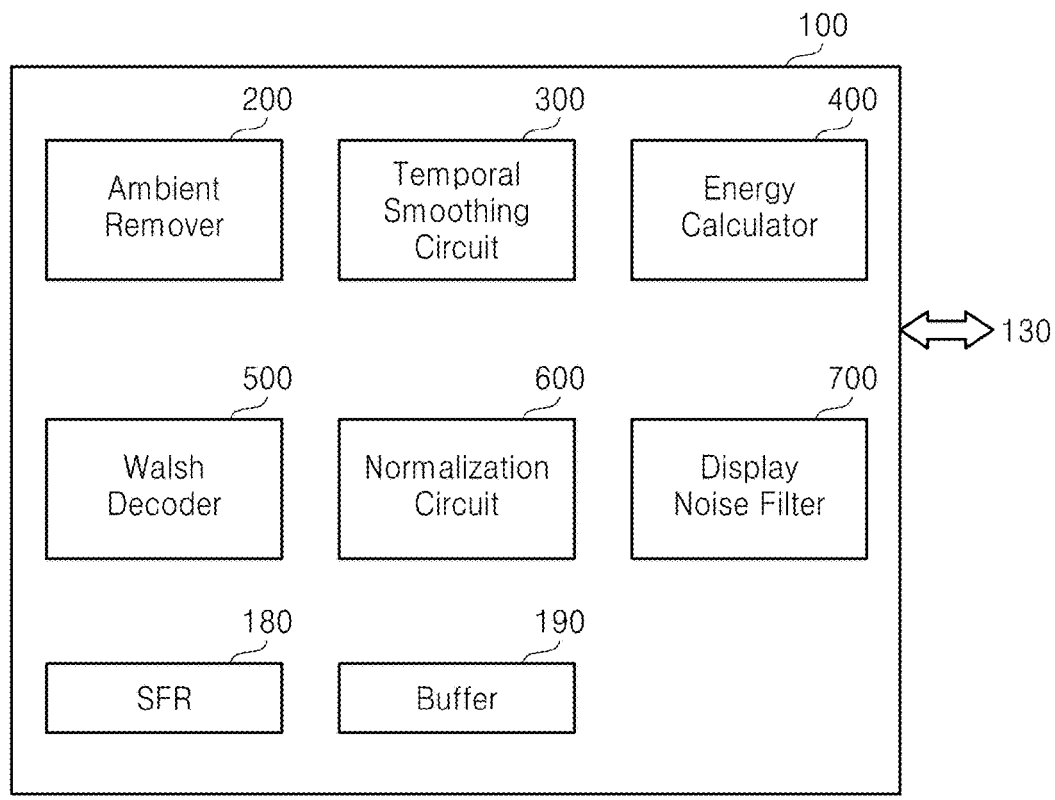
FIG. 3 is a block diagram of an HDMA, according to an exemplary embodiment.

FIG. 3 is a block diagram of the HDMA 100, according to an exemplary embodiment. Referring to FIG. 3, the HDMA 100 includes an ambient remover 200, a temporal smoothing circuit 300, an energy calculator 400, a Walsh decoder 500, a normalization circuit 600, and a display noise filter 700. The HDMA 100 may also include a special function register (SFR) 180 and a common buffer 190.

The SFR 180 stores a setting value for an operation of the HDMA 100. The setting value of the SFR 180 may be set by the application processor 40 or software executed by the application processor 40. The common buffer 190 may temporarily stores data which has been read from the memory 140 to be processed in the HDMA 100 or data that has been processed in the HDMA 100. The common buffer 190 may be shared by algorithm processing circuits in the HDMA 100 for efficient use of resources. For instance, the SFR 180 and the common buffer 190 may be shared by at least two circuits 200 through 700 in the HDMA 100.

The ambient remover 200 removes an offset component which is widespread throughout the touch panel 20 and increases a signal level. For instance, the ambient remover 200 may store offset components, which have been applied to the entire touch panel 20, in a single frame buffer and may calculate frame touch data pixel by pixel. A buffer which stores frame offset data and a buffer which stores frame touch data may be implemented in the memory 140 or in a separate buffer.

In a comparison example of an example of the inventive concept, an offset value and touch data may be read from the memory 140 and calculated pixel by pixel, and a calculation result may be recorded in the memory 140. When the offset value and the touch data are read and calculated for each pixel and calculated data is stored in the memory 140, a time taken to read and decode a command and prepare to send an AHB signal through the bus 130 is much longer than a time taken to actually read and write data. Consequently, it may take 20 to 30 cycles to obtain pixel data with an offset removed for a single pixel. When a 1-pixel touch data is 16 bits and the bus 130 has a bandwidth of 32 bits, bus use efficiency decreases. In other words, even though the bus 130 can transmit 32-bit data at a time, 16-bit data is read at a time using only half of the bandwidth. As a result, time efficiency is decreased.

<Ambient Offset Removal>

Figure 4:
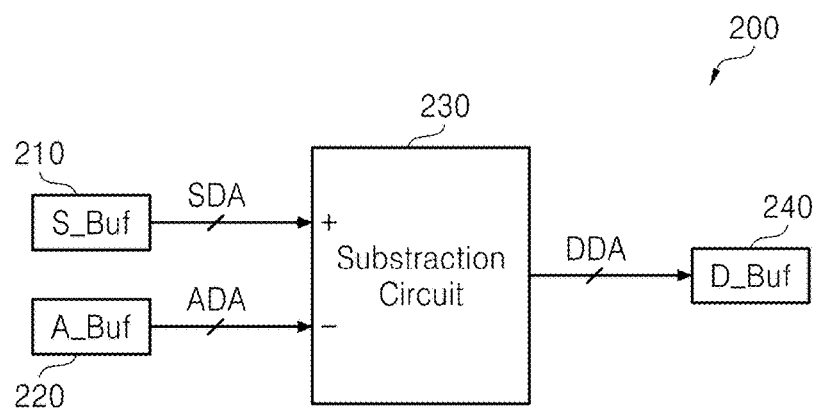
FIG. 4 is a block diagram of an ambient remover, according to an exemplary embodiment.

FIG. 4 is a block diagram of the ambient remover 200, according to an exemplary embodiment. Referring to FIGS. 3 and 4, the ambient remover 200 includes a source buffer 210, an ambient offset buffer 220, a subtraction circuit 230, and a destination buffer 240. The source buffer 210, the ambient offset buffer 220, and the destination buffer 240 may be implemented as a register. According to an exemplary embodiment, the source buffer 210, the ambient offset buffer 220, and the destination buffer 240 may be implemented as the common buffer 190 illustrated in FIG. 3.

The source buffer 210 is a buffer which stores source data SDA. The ambient offset buffer 220 is a buffer which stores an ambient offset value ADA. The source data SDA stored in the source buffer 210 may be touch data which is processed in the AFE 120 and then stored in the memory 140 or touch data which is processed at least one circuit in the HDMA 100 and then stored in the memory 140.

The ambient offset value ADA is a value obtained by quantifying an offset component applied to each pixel in the touch panel 20. The ambient offset value ADA corresponding to a single frame may be determined through a test and simulation of the touch panel 20.

The subtraction circuit 230 may subtract the ambient offset value ADA of the ambient offset buffer 220 from the source data SDA of the source buffer 210, and generate output data DDA with an offset removed. The output data DDA of the subtraction circuit 230 may be stored in the destination buffer 240.

According to an exemplary embodiment, the ambient offset buffer 220 may be used as the destination buffer 240. The ambient offset buffer 220 and the destination buffer 240 may be implemented as one register. In this case, the ambient offset buffer 220 may be overwritten by the output data DDA.

The subtraction circuit 230 may process the source data SDA and the ambient offset value ADA in units of "h" pixels, where "h" is at least 1. When "h" is 2, the subtraction circuit 230 may perform an operation of subtracting a first offset value from first source data and an operation of subtracting a second offset value from second source data in parallel or simultaneously. For this operation, the subtraction circuit 230 may include "h" unit subtractors.

Figure 5:
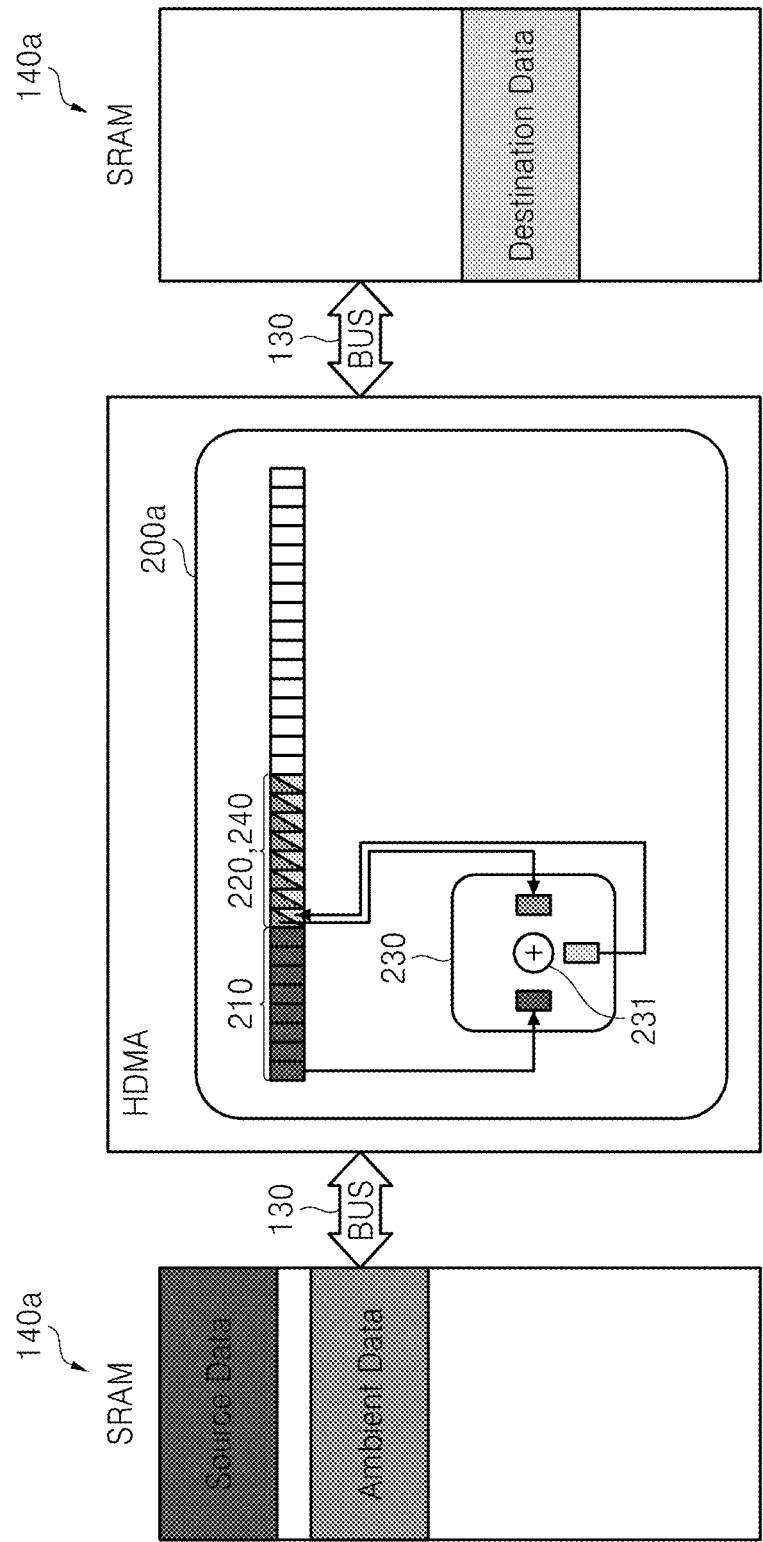
FIG. 5 is a diagram for explaining an example of the ambient remover illustrated in FIG. 4 and an operation of the ambient remover, according to an exemplary embodiment.

FIG. 5 is a diagram for explaining an example 200a of the ambient remover 200 illustrated in FIG. 4 and an operation of the ambient remover 200, according to an exemplary embodiment. FIG. 6A is a schematic timing chart showing an operation of the ambient remover 200a illustrated in FIG. 5, according to an exemplary embodiment. Referring to FIGS. 5 and 6A, the common buffer 190 may include a plurality of L-bit registers. Here, L may be the same as the number of bits (e.g., 16) in pixel data, but the inventive concept is not restricted to this exemplary embodiment.

Some of the L-bit registers may be used as the source buffer 210 and others of the L-bit register may be used as the ambient offset buffer 220 and the destination buffer 240. According to an exemplary embodiment, the common buffer 190 is implemented by 32 L-bit registers, the source buffer 210 is implemented by eight (8) L-bit registers in the common buffer 220, and the ambient offset buffer 220 is implemented by eight (8) L-bit registers in the common buffer 220. However, the inventive concept is not restricted to this exemplary embodiment.

Referring to FIGS. 5 and 6A, source data (i.e., pixel data) of a frame and ambient data (i.e., offset data) of the frame are stored in a memory 140a (corresponding to the memory 140 in FIG. 2), and the ambient remover 200a operates in a burst mode or a continuous single mode in 32-bit word units. In the timing charts illustrated in FIGS. 6A, 6B, 10A, 10B, 14A through 14C, 18, and 20, "HCLK" denotes an operating clock signal of the HDMA 100, "HADDR" denotes an address signal indicating a position in the memory 140a where data is read from or written to, "HRDATA" denotes data read from the memory 140a, HWDATA denotes data to be written to the memory 140a, "HTRANS" denotes a signal indicating whether the bus 130 is idle or not, and "HSIZE" denotes a size of data transferred at a time.

The ambient remover 200 may write two pixel data at a time using the 32-bit bus 130. According to an exemplary embodiment, the ambient remover 200 may operate in a continuous single mode or four burst modes in 32-bit word units (i.e., two pixel data units), but the inventive concept is not restricted to the exemplary embodiment.

In the embodiments illustrated in FIGS. 5 and 6A, the ambient remover 200 may read eight pixel data HRDATA S_00 through S_07 sequentially from the memory 140a through four times of reading, and may sequentially store the pixel data HRDATA S_00 through S_07 in the source buffer 210, i.e., eight (8) L-bit registers. For this operation, the ambient remover 200 may output an address HADDR S_00 through S_07 for reading the pixel data HRDATA S_00 through S_07 to the bus 130 in response to a start signal START, and may receive the pixel data HRDATA S_00 through S_07 corresponding to the address HADDR S_00 through S_07 through the bus 130.

Thereafter, the ambient remover 200 may read eight offset data HRDATA A_00 through A_07 sequentially from the memory 140a through four times of reading, and may sequentially store the offset data HRDATA A_00 through A_07 in the ambient offset buffer 220, i.e., eight (8) L-bit registers. When an offset value is stored in the ambient offset buffer 220, the ambient remover 200 may perform subtraction on pixel data stored in the source buffer 210 and offset data stored in the ambient offset buffer 220 pixel by pixel, and may sequentially store output data HWDATA D_0 through D_7 corresponding to subtraction results in the ambient offset buffer 220.

The ambient remover 200 generates an address HADDR D_0 through D_7 for designating the position in the memory 140a to which the output data HWDATA D_0 through D_7 stored in the ambient offset buffer 220 will be written to, and enables a write signal HWRITE. Accordingly, the output data HWDATA D_0 through D_7 are written to a region corresponding to the address HADDR D_0 through D_7 in the memory 140a.

The transfer signal HTRANS indicates whether the bus 130 is idle or not. In other words, when the bus 130 is not operating (i.e., not performing a transfer operation), the transfer signal HTRANS indicates an idle state. Accordingly, the fewer the number of idle states indicated by the transfer signal HTRANS, the higher the bus efficiency. When the transfer signal HTRANS is expressed as "NON-SEQ", it indicates a single mode, i.e., a non-idle state, and when it is expressed as "IDLE", it indicates an idle state.

Accordingly, the ambient remover 200 operates in a burst mode or a continuous single mode, and transfers "h" pixel data at a time, thereby increasing the bus efficiency. In addition, the destination buffer 230 is used as the destination buffer 230 using the common buffer 190 in the HDMA 100, so that a fast processing speed is achieved with a small area. Therefore, 1.5 cycles are enough to process one pixel data.

In other exemplary embodiments, the source buffer 210 and the ambient offset buffer 220 may be implemented as a line buffer. The line buffer stores pixel data corresponding to one line. For instance, when the touch panel 20 includes 33 row channels and 25 column channels, i.e., 33×25 channels; the line buffer may be formed of 25 registers. Accordingly, the source buffer 210 and the ambient offset buffer 220 each may be implemented as a single line buffer, i.e., 25 registers. However, the source buffer 210 and the ambient offset buffer 220 need to be formed according to the longest line in light of the change in the length of a line (i.e., the number of pixels in a line). Therefore, a more area than is actually used is required and the implementation varies with the number of channels changing according to a chip or product.

The HDMA 100 operates in a burst mode or a continuous single mode in the exemplary embodiment illustrated in FIG. 6A. However, the HDMA 100 may operate in a single mode in other embodiments.

FIG. 6B is a schematic timing chart showing an operation of the ambient remover 200 in a single mode, according to an exemplary embodiment. In the single mode, the ambient remover 200 sequentially reads pixel data S_00 and offset data A_00 from the memory 140a, calculates output data D_0 by subtracting the offset data A_00 from the pixel data S_00, and stores the output data D_0 in the memory 140a. As described above, it can be seen that the transfer signal HTRANS confirms a cycle where an idle mode is entered and one pixel data is processed in about four cycles in the single mode.

Table 1 shows a total area of the source buffer 210 and the ambient offset buffer 220 and the number of cycles required per pixel when the ambient remover 200 is implemented in a single mode, a burst mode (or a continuous single mode), and a line buffer. Here, it is assumed that the number of gates needed to form a 1-bit register, i.e., a gate count is 8.

TABLE 1

|  | Single Mode | Burst Mode | Line buffer |
| --- | --- | --- | --- |
| Source buffer | 16 bits * 1 EA * 8 gates | 16 bits * 8 EA * 8 gates | 16 bits * 25 EA * 8 gates |
| Ambient offset buffer | 16 bits * 1 EA * 8 gates | 16 bits * 8 EA * 8 gates | 16 bits * 25 EA * 8 gates |
| Total Area | gate count 128 | gate count 2,048 | gate count 6,400 |
| Cycle/Pixel | 4 | 1.5 | 1.5 |

<Temporal Smoothing>

Figure 7:
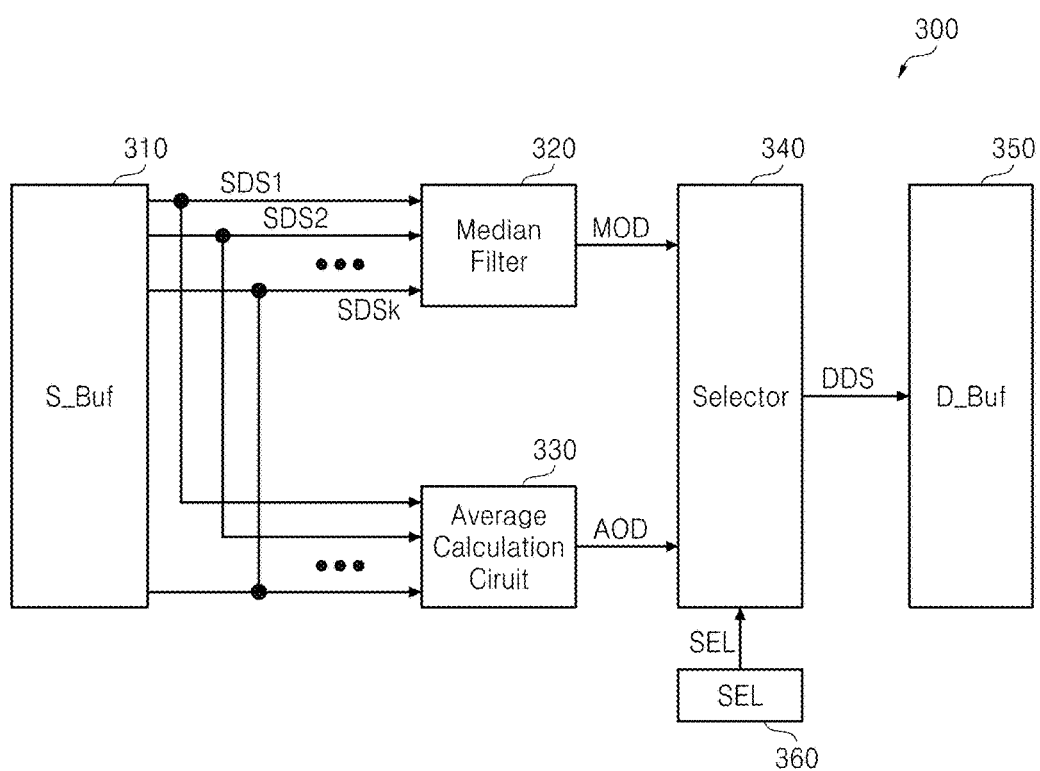
FIG. 7 is a block diagram of a temporal smoothing circuit illustrated in FIG. 3, according to an exemplary embodiment.

FIG. 7 is a block diagram of the temporal smoothing circuit 300 illustrated in FIG. 3, according to an exemplary embodiment. The temporal smoothing circuit 300 receives k-frame data and removes noise which appears for a short time, where "k" is a natural number of at least 2. For instance, the temporal smoothing circuit 300 may calculate an average or median value of pixel data at the same positions in a plurality of (e.g., k=3) frames, and remove peak noise from the average or median value, to calculate output data.

The temporal smoothing circuit 300 may include a source buffer 310, a median filter 320, an average calculation circuit 330, a selector 340, and a destination buffer 350. The source buffer 310 and the destination buffer 350 may be implemented using the common buffer 190 illustrated in FIG. 3.

The median filter 320 may select a median value from pixel data SDS1 through SDSk at the same positions in a plurality of (e.g., k=3) frame data, which are received from the source buffer 310, and may output median filtered data MOD. The average calculation circuit 330 may average the pixel data SDS1 through SDSk and may output an average value AOD.

The selector 340 may select either the median filtered data MOD or the average value AOD in response to a selection signal SEL to generate output data DDS. The selection signal SEL may be set by the application processor 40 in an SFR 360. The SFR 360 may be part of the SFR 180 illustrated in FIG. 3.

Figure 8:
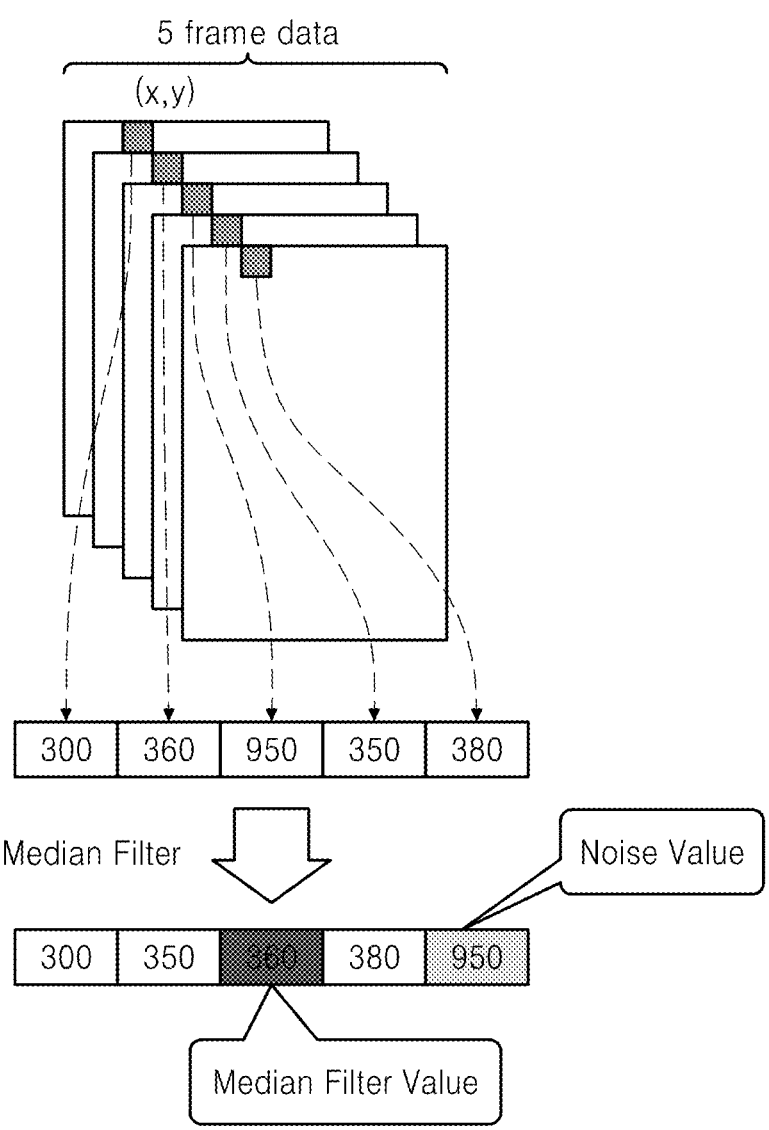
FIG. 8 is a diagram for explaining a method of calculating median filtered data using five frame data in a median filter illustrated in FIG. 7, according to an exemplary embodiment.

FIG. 8 is a diagram for explaining a method of calculating the median filtered data MOD using five frame data in the median filter 320 illustrated in FIG. 7, according to an exemplary embodiment. The median filter 320 may select a median value of 360 from among pixel data 300, 360, 950, 350, and 380 at the same positions in five frame data and may output the median value of 360 as the median filtered data MOD.

Figure 9:
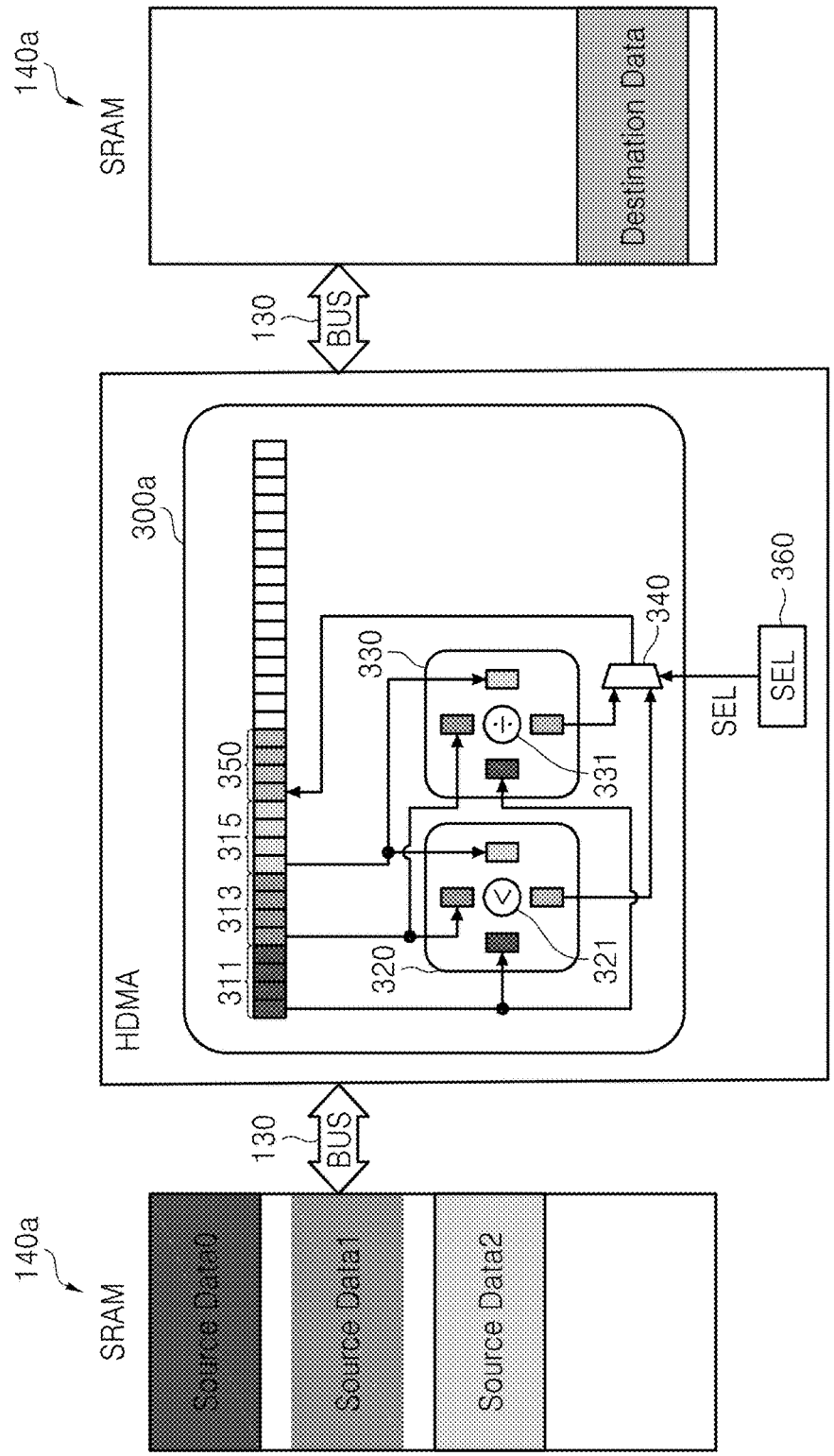
FIG. 9 is a diagram for explaining an example of the temporal smoothing circuit illustrated in FIG. 7 and an operation of the temporal smoothing circuit, according to an exemplary embodiment.
Figure 10A:
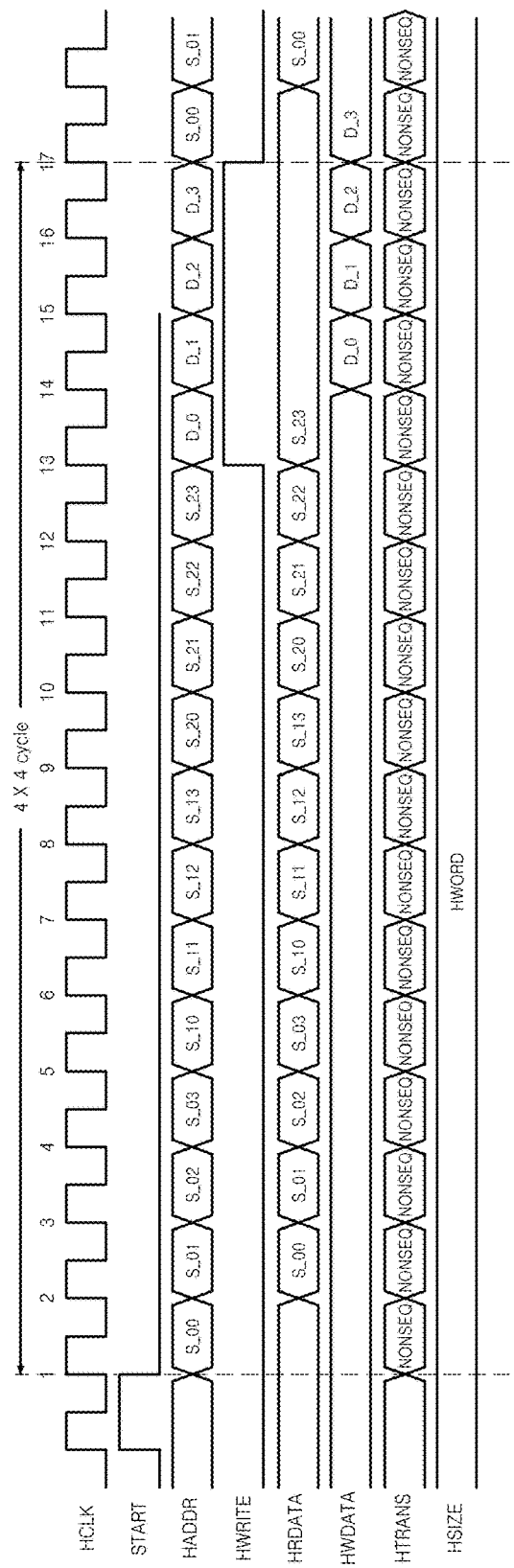
FIG. 10A is a schematic timing chart showing the operation of the temporal smoothing circuit, according to an exemplary embodiment.

FIG. 9 is a diagram for explaining an example 300a of the temporal smoothing circuit 300 illustrated in FIG. 7 and an operation of the temporal smoothing circuit 300, according to an exemplary embodiment. FIG. 10A is a schematic timing chart showing an operation of the temporal smoothing circuit 300a according to an exemplary embodiment. In the exemplary embodiments illustrated in FIGS. 9 and 10A, the temporal smoothing circuit 300a performs temporal smoothing using three frame data.

Referring to FIGS. 9 and 10A, the source buffer 310 may include first through third source buffers 311, 313, and 315. The first through third source buffers 311, 313, and 315 and the destination buffer 350 may be part of the common buffer 190.

Three frame data are stored in a memory 140a. The three frame data are respectively referred to as first source data (i.e., Source Data0 ), second source data (i.e., Source Data1), and third source data (i.e., Source Data2).

The temporal smoothing circuit 300 may sequentially read four pixel data S_00 through S_03 among the first source data from the memory 140a and may sequentially store the pixel data S_00 through S_03 in four L-bit registers, i.e., the first source buffer 311 in the source buffer 310. Next, the temporal smoothing circuit 300 may sequentially read four pixel data S_10 through S_13 among the second source data from the memory 140a and may sequentially store the pixel data S_10 through S_13 in four L-bit registers, i.e., the second source buffer 313 in the source buffer 310. Next, the temporal smoothing circuit 300 may sequentially read four pixel data S_20 through S_23 among the third source data from the memory 140a and may sequentially store the pixel data S_20 through S_23 in four L-bit registers, i.e., the third source buffer 315 in the source buffer 310.

The median filter 320 may receive pixel data at the same positions in the first through third source data and may sequentially select and output median values. For this operation, the median filter 320 may include at least one comparator 321. The average calculation circuit 330 may include a calculator 331 which adds pixel data at the same positions in the first through third source data and divides an addition result by the number of pixel data (e.g., k=3). The selector 340 may be implemented as a multiplexer which selects and outputs either output data of the median filter 320 or output data of the average calculation circuit 330 in response to a selection signal SEL. There may be "h" median filters 320, "h" average calculation circuits 330, and "h" selectors 340 for parallel processing, where "h" may be 2.

Output data D_0 through D_3 are stored in the destination buffer 350. The temporal smoothing circuit 300a writes the output data D_0 through D_3 stored in the destination buffer 350 to the memory 140a through the bus 130.

In the exemplary embodiment illustrated in FIG. 10A, one pixel data is read at a time and a processing time of four cycles is required per pixel. Accordingly, 4*4 cycles are required to process four pixel data.

Figure 10B:
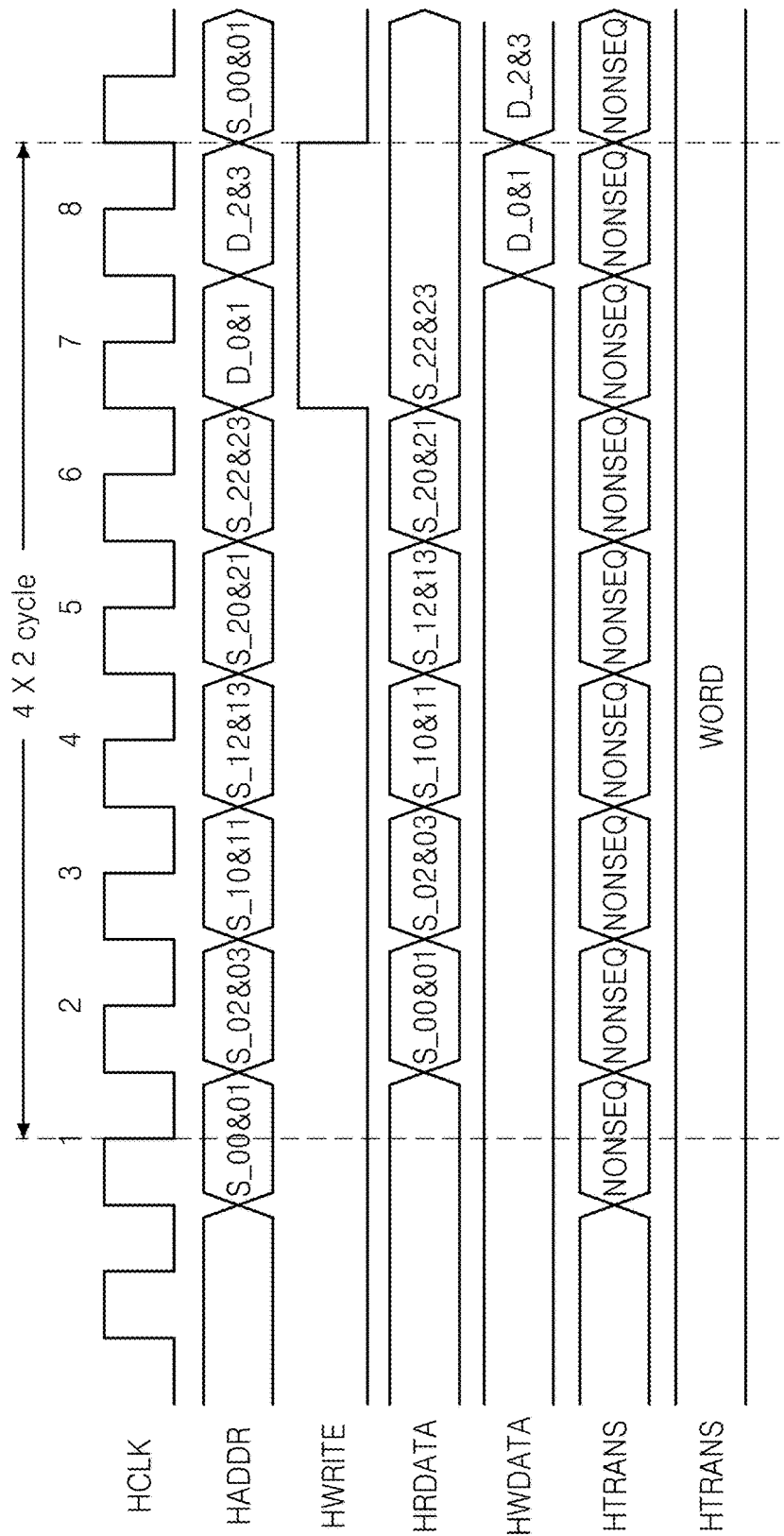
FIG. 10B is a timing chart showing an operation of processing two pixel data at a time using two median filters, according to an exemplary embodiment.

FIG. 10B is a timing chart showing an operation of processing two pixel data at a time using two median filters, according to an exemplary embodiment. Referring to FIG. 10B, the temporal smoothing circuit 300a reads two pixel data from the memory 140a at a time and processes the two pixel data in parallel using two median filters.

Accordingly, the number of clock cycles required per pixel is two which is half of the cycles required in the exemplary embodiments illustrated in FIG. 10A. In the exemplary embodiments illustrated in FIGS. 10A and 10B, the bus 130 is used with the maximum efficiency since the transfer signal HTRANS does not enter the idle state IDLE.

According to an exemplary embodiment, the circuits 200, 300, 400, 500, 600, and 700 in the HDMA 100 may sequentially operate. At this time, each circuit in the HDMA 100 may process pixel data using the common buffer 190. Since a buffer used by each circuit is implemented as a common buffer, a circuit area is remarkably reduced.

<Energy Calculation>

Figure 11:
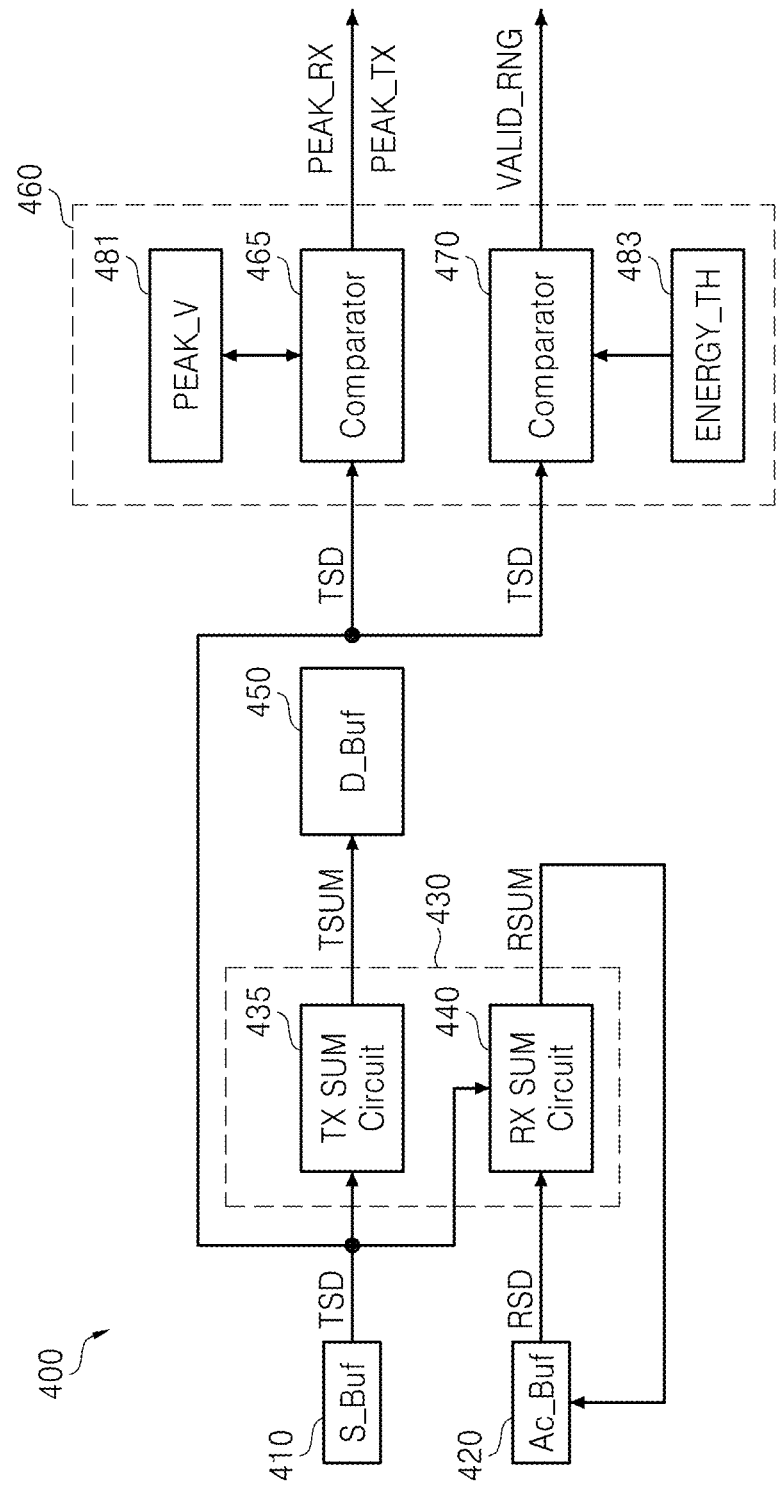
FIG. 11 is a block diagram of an energy calculator, according to an exemplary embodiment.
Figure 12:
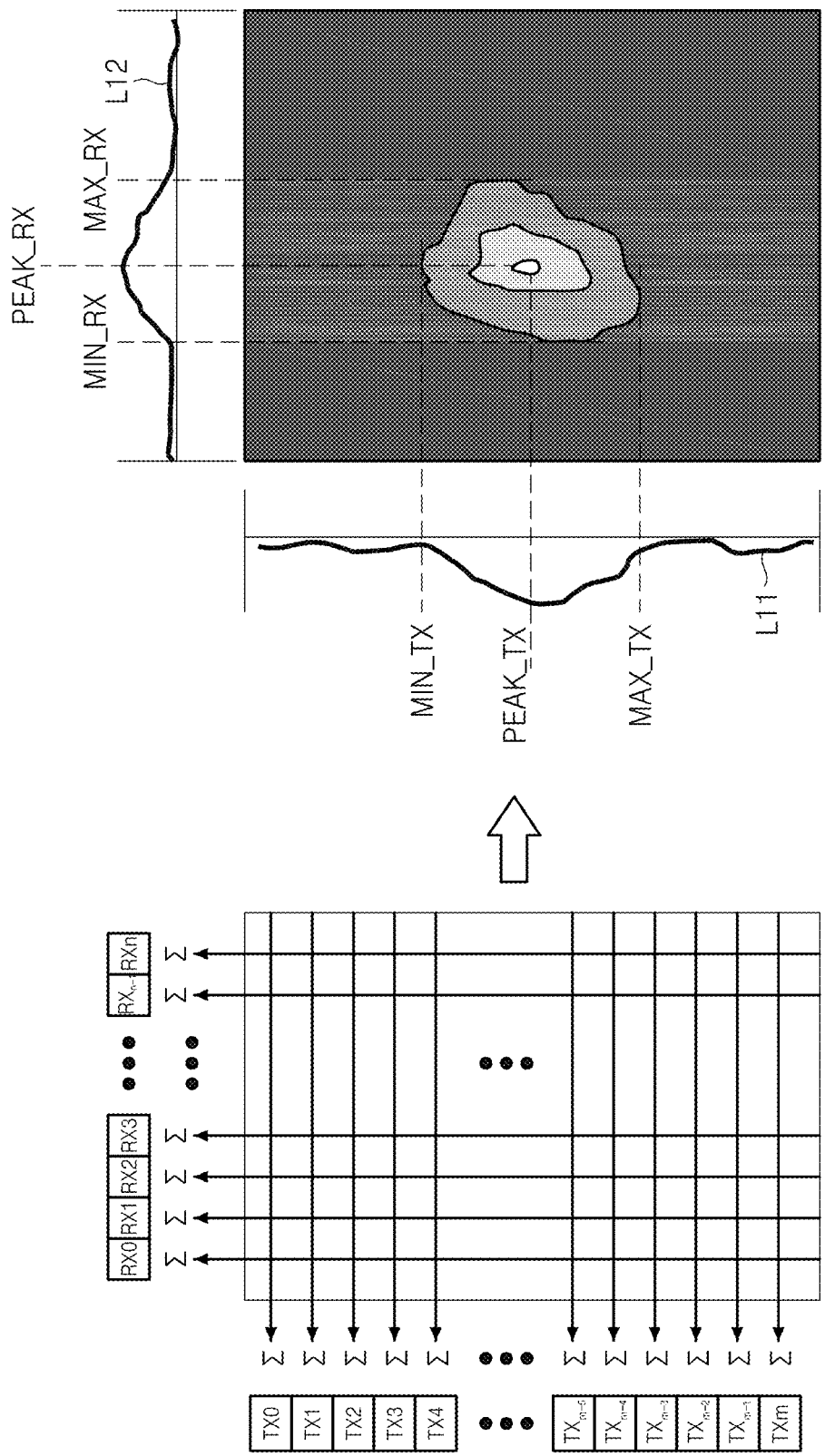
FIG. 12 is a diagram for explaining an operation of the energy calculator illustrated in FIG. 11, according to an exemplary embodiment.

FIG. 11 is a block diagram of the energy calculator 400, according to an exemplary embodiment. FIG. 12 is a diagram for explaining an operation of the energy calculator 400 illustrated in FIG. 11, according to an exemplary embodiment. Referring to FIGS. 11 and 12, the energy calculator 400 may include a source buffer 410, a column accumulation buffer 420, an energy accumulator 430, a row accumulation buffer 450, and an energy peak detector 460.

The energy accumulator 430 may includes a row channel sum circuit 435 and a column channel sum circuit 440. The energy peak detector 460 may include at least two comparators 465 and 470 and at least two SFRs 481 and 483.

The energy calculator 400 adds all signals appearing in every channel of the touch panel 20 and detects a current position having the greatest touch signal in the touch panel 20.

The row channel sum circuit 435 adds pixel data of row channels in 1-frame data and the column channel sum circuit 440 adds pixel data of column channels in the frame data. When 1-frame data is expressed as a two-dimensional array value, pixel data at a top left point is represented with P(0, 0), and pixel data at a bottom right point is represented with P(m, n). Further, data RXn corresponding to a sum of pixel data in the n-th column may be expressed as Equation 1, and data TXm corresponding to a sum of pixel data in the m-th row may be expressed as Equation 2, as below.

$$RXn = \sum_{i=0}^{m} P(n, i) \quad (1)$$

$$TXm = \sum_{i=0}^{n} P(i, m) \quad (2)$$

In FIG. 12, TX0 through TXm each denotes data corresponding to a sum of pixel data of a corresponding row, and RX0 through RXn each denotes data corresponding to a sum of pixel data of a corresponding column.

The row channel sum circuit 435 may receive at least two pixel data TSD from the source buffer 410, add the at least two pixel data TSD, and store row accumulation data TSUM corresponding to a result of the addition in the row accumulation buffer 450. The column channel sum circuit 440 may receive the pixel data TSD from the source buffer 410 and column accumulation data RSD from the column accumulation buffer 420, add the pixel data TSD and the column accumulation data RSD, and update the column accumulation buffer 420 with column accumulation data RSUM corresponding to the addition result.

The energy peak detector 460 of the energy calculator 400 may detect positions and numbers of peak values, a size of a touched area, and positional distribution of valid data from frame data. The energy peak detector 460 may receive the pixel data TSD from the source buffer 410, compare the pixel data TSD with a peak value PEAK_V of the peak value register 481, detect the greatest peak value in the frame data, and calculate a position (PEAK_RV, PEAK_TX) of pixel data corresponding to the peak value.

The energy peak detector 460 may also compare the pixel data TSD from the source buffer 410 with an energy threshold ENERGY_TH of the energy threshold register 483 and detect a range of pixel data greater than the energy threshold ENERGY_TH in the frame data as a touch range VALID_RNG. The touch range VALID_RNG may include a minimum column value MIN_RX, a maximum column value MAX_RX, a minimum row value MIN_TX, and a maximum row value MAX_TX illustrated in FIG. 12.

Figure 13:
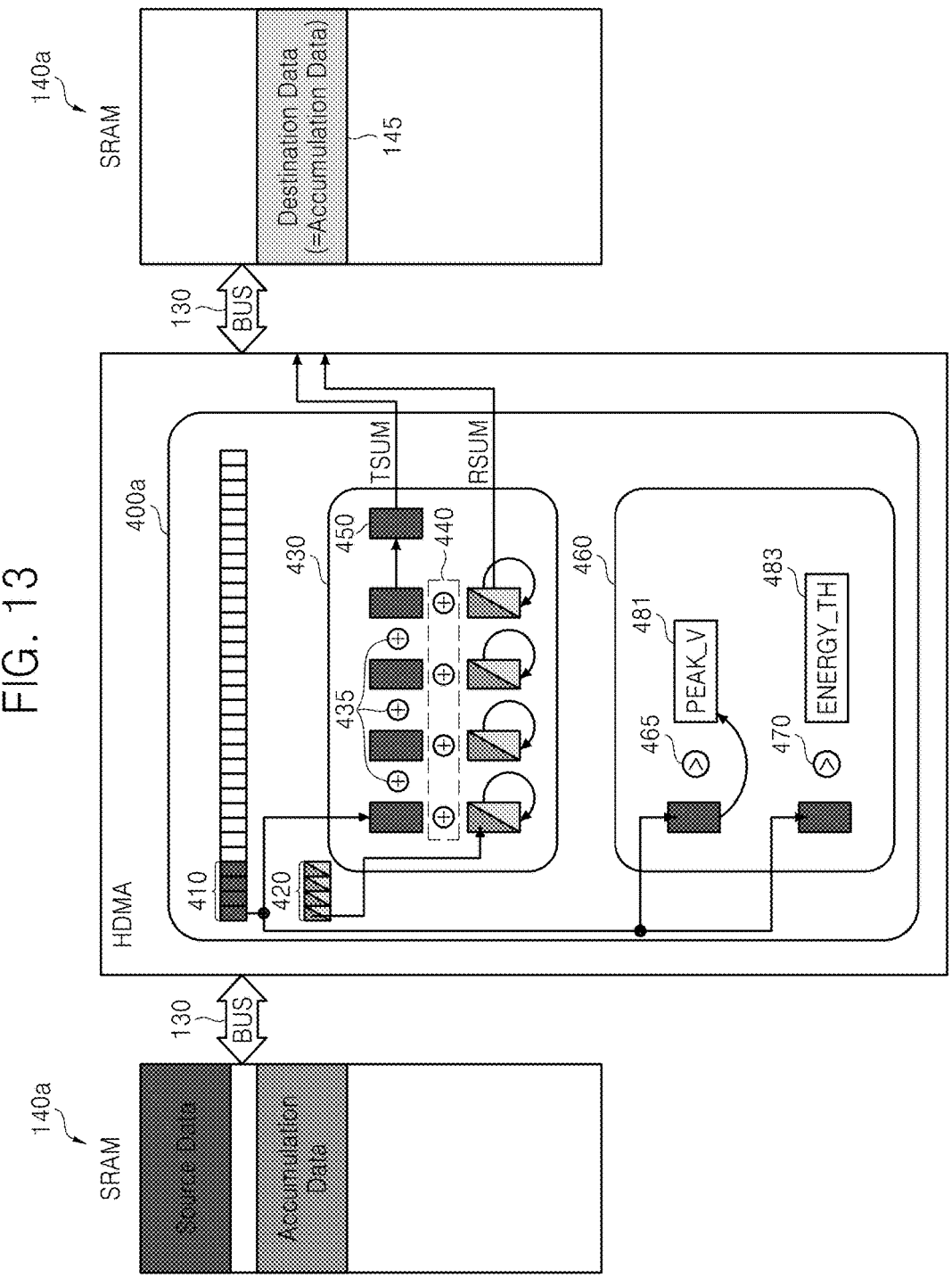
FIG. 13 is a diagram of an example of the energy calculator illustrated in FIG. 11.

FIG. 13 is a diagram of an example 400a of the energy calculator 400 illustrated in FIG. 11, according to an exemplary embodiment. FIG. 14A is a timing chart showing an operation of the energy calculator 400a, according to an exemplary embodiment. Referring to FIGS. 11 through 14A, the source buffer 410 may be part of the common buffer 190 illustrated in FIG. 3, and each of the row accumulation buffer 450 and the column accumulation buffer 420 may be implemented using at least one flip-flop, but the inventive concept is not restricted to the exemplary embodiments.

The energy calculator 400a reads source data from a memory 140a and stores the source data in the source buffer 410. For instance, P pixel data S_00 through S_03 in one row may be read at a time and stored in P L-bit registers of the source buffer 410. Here, it is assumed that P is 4, but the inventive concept is not restricted to this assumption.

The row channel sum circuit 435 may add pixel data S_00 through S_03 stored in the source buffer 410 and store a sum of the pixel data S_00 through S_03 in the row accumulation buffer 450. When the four pixel data S_00 through S_03 in a first row are stored in the source buffer 410, the row channel sum circuit 435 may calculate a sum of the four pixel data S_00 through S_03 and store the sum in the row accumulation buffer 450. Thereafter, when subsequent four pixel data S_04 through S_07 in the first row are stored in the source buffer 410, the row channel sum circuit 435 may calculate a sum of the four pixel data S_04 through S_07 in the first row and accumulate the sum to the row accumulation data TSUM that has been stored in the row accumulation buffer 450 to update the row accumulation buffer 450. In such manner, when addition of all pixel data in the first row is completed, accumulation data TSUM of the first row stored in the row accumulation buffer 450 may be stored in the memory 140a.

The column channel sum circuit 440 may add pixel data stored in the source buffer 410 and column accumulation data stored in the column accumulation buffer 420 for each column and may update the column accumulation buffer 420 with an addition result. The column accumulation buffer 420 may have an initial value of 0. Accordingly, when the pixel data S_00 through S_03 of the first row is stored in the source buffer 410, the column channel sum circuit 440 may add the pixel data S_00 through S_03 of the first row and the initial value for each column and may store an addition result in the column accumulation buffer 420. Data stored in the column accumulation buffer 420 may be written to the memory 140a in units of four data. After the addition of first-row pixel data is performed with respect to each column and accumulation data for each column is stored in the memory 140a, second-row pixel data are read from the memory 140a and stored in the source buffer 410. Column accumulation data RX_00 through RX_03 are also read from the memory 140a and stored in the column accumulation buffer 420.

Thereafter, the column channel sum circuit 440 may add the second-row pixel data stored in the source buffer 410 and column accumulation data (i.e., the first-row pixel data) stored in the column accumulation buffer 420 for each column and store an addition result in the column accumulation buffer 420. In such manner, pixel data of all rows in 1-frame data may be added for each column.

In FIG. 12, a line L11 shows a result of adding pixel data in each row and a line L12 shows a result of adding pixel data in each column. As shown in FIG. 12, a buffer storing the column accumulation data RX0 through RXn and a buffer storing row accumulation data TX0 through TXm are set by predetermined addresses in the memory 140a. In other words, a row line buffer and a column line buffer are implemented in a memory SRAM without using a flip-flop requiring a large area.

The energy peak detector 460 sequentially receives pixel data from the source buffer 410 and compares the pixel data with the predetermined peak value PEAK_V. When current pixel data is greater than the peak value PEAK_V, the energy peak detector 460 stores positions of a corresponding row and column (e.g., channel numbers) in a peak row register (not shown) and a peak column register (not shown), respectively, and updates the peak value PEAK_V with the current pixel data. The peak value PEAK_V may be stored in the peak value register 381 and may be initialized to a predetermined value (e.g., 0).

Each time when pixel data is greater than the peak value PEAK_V, the peak value PEAK_V and the positions of the corresponding row and column are updated. Accordingly, the energy peak detector 460 detects the greatest pixel data in 1-frame data as the peak value PEAK_V and may store row and column positions PEAK_TX and PEAK_RX of the pixel data in a peak row register and a peak column register, respectively. In the above-described manner, the energy peak detector 460 may detect at least two peak values (e.g., the greatest pixel data and the second greatest pixel data) in 1-frame data.

The energy peak detector 460 may include the comparators 465 and 470 and a plurality of the registers 481 and 483. The registers 481 and 483 may be implemented as part of the SFR 180 illustrated in FIG. 3.

The energy peak detector 460 may also receive pixel data sequentially from the source buffer 410 and compare the pixel data with the predetermined energy threshold ENERGY_TH to detect a touch range. The energy threshold ENERGY_TH may be stored in the energy threshold register 483 and may be set by an application processor according to a scenario or noise environment.

When current pixel data is greater than the energy threshold ENERGY_TH, the energy peak detector 460 may compare a row number corresponding to the current pixel data with a minimum row value MIN_TX and a maximum row value MAX_TX, and may compare a column number corresponding to the current pixel data with a minimum column value MIN_RX and a maximum column value MAX_RX. The energy peak detector 460 may update the minimum row value MIN_TX with a row number when the row number is less than the minimum row value MIN_TX and may update the maximum row value MAX_TX with a row number when the row number is greater than the maximum row value MAX_TX. The energy peak detector 460 may also update the minimum column value MIN_RX with a column number when the column number is less than the minimum column value MIN_RX and may update the maximum column value MAX_RX with a column number when the column number is greater than the maximum column value MAX_RX.

In this manner, the energy peak detector 460 may detect a range (or region) which pixel data greater than the predetermined energy threshold ENERGY_TH belong to and determine the detected range as a touch region. As shown in FIG. 12, the position (PEAK_RX, PEAK_TX) of a peak value detected by the energy peak detector 460 may belong to a touch range (defined by MIN_RX, MAX_RX, MIN_TX, and MAX_TX).

As described above, the data RX0 through RXn and the data TX0 through TXm have been stored in the memory 140a. The first through fourth source data S_00 through S_03 are read from the memory 140a and stored in the source buffer 410, and the column accumulation data RX_00 through RX_03 are read from the memory 140a and stored in the column accumulation buffer 420. The source data S_00 through S_03 and the column accumulation data RX_00 through RX_03 are respectively added for respective column channels. The addition results are stored for the respective column channels. According to the current exemplary embodiment, there is no cycle for the addition of accumulated values in each column channel. In the exemplary embodiment illustrated in FIG. 14A, one pixel data is read from or written to memory during one cycle.

Figure 14B:
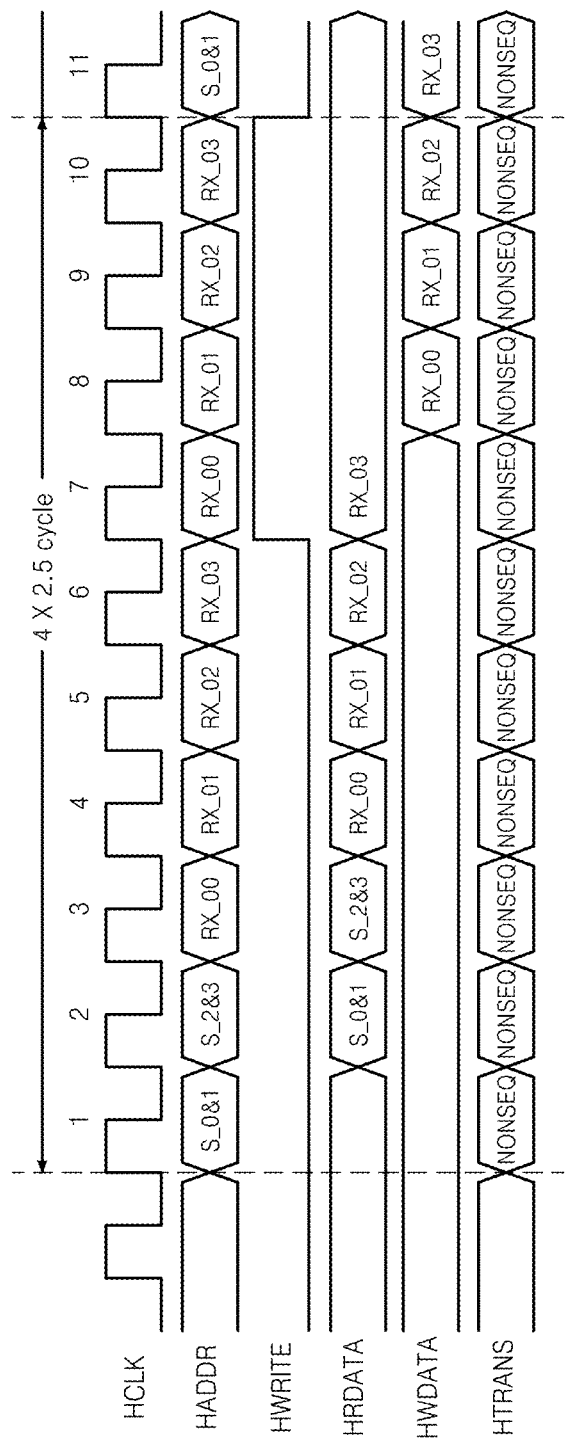
FIGS. 14B and 14C are timing charts showing operations of the energy calculator according to exemplary embodiments.
Figure 14C:
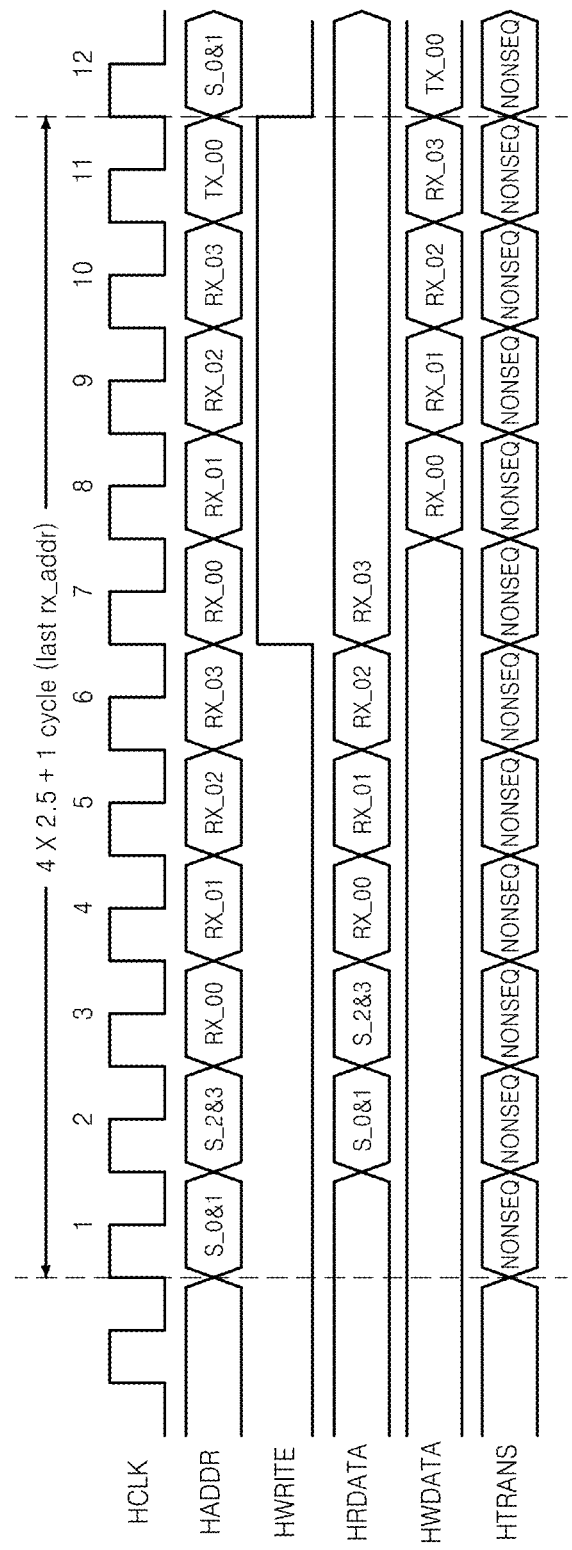

FIGS. 14B and 14C are timing charts showing operations of the energy calculator 400a, according to exemplary embodiments. In the exemplary embodiments illustrated in FIGS. 14B and 14C, two pixel data (i.e., a 32-bit word) are read from or written to the memory 140 during one cycle.

In order to increase efficiency of the bus 130, two source data S_00 and S_01 are read from the memory 140a and stored in the source buffer 410 during a first cycle, and subsequent two source data $S_{13}$ 02 and S_03 are read from the memory 140a and stored in the source buffer 410 during a second cycle. Similarly, the column accumulation data RX_00 through RX_03 are read and stored in the column accumulation buffer 420 during two cycles and accumulated for respective channels. Thereafter, the accumulation results are stored for the respective column channels.

Referring to FIG. 14C, when column accumulation data are calculated for up to the last column and then the column accumulation data RX_00 through RX_03 of the column accumulation buffer 420 are written to the memory 140a, the row accumulation data TX_00 of the row accumulation buffer 450 are stored in the memory 140a. For instance, after the column accumulation data RX_00 through RX_03 accumulated up to the last column are stored in the memory 140a for one row, the row accumulation data TX_00 of the row may be stored in the memory 140a in a subsequent cycle (i.e., the eleventh cycle in FIG. 14C).

As described above, according to exemplary embodiments, only P (e.g., 4) L-bit (e.g., 16-bit) registers 410 required to read source data, P 32-bit registers 420 for temporarily storing an accumulated value for each column channel, and one 32-bit register 450 for temporarily storing an accumulated value for a row channel are required to store data apart from an SFR. Accordingly, column accumulation data and row accumulation data can be calculated without a line buffer or many registers. As a result, a circuit area is reduced.

<Walsh Decoder>

Figure 15:
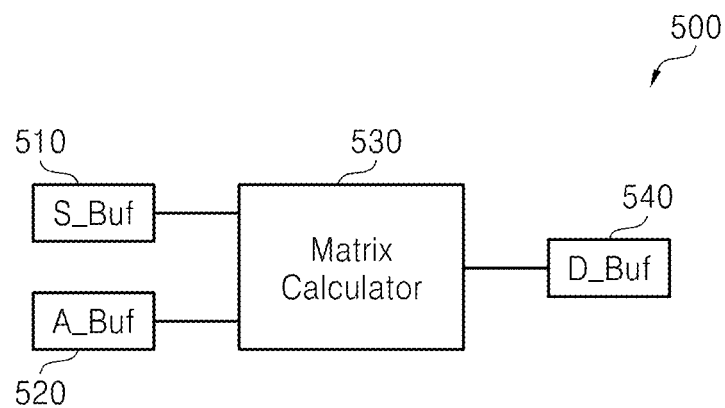
FIG. 15 is a block diagram of a Walsh decoder, according to an exemplary embodiment.
Figure 16:
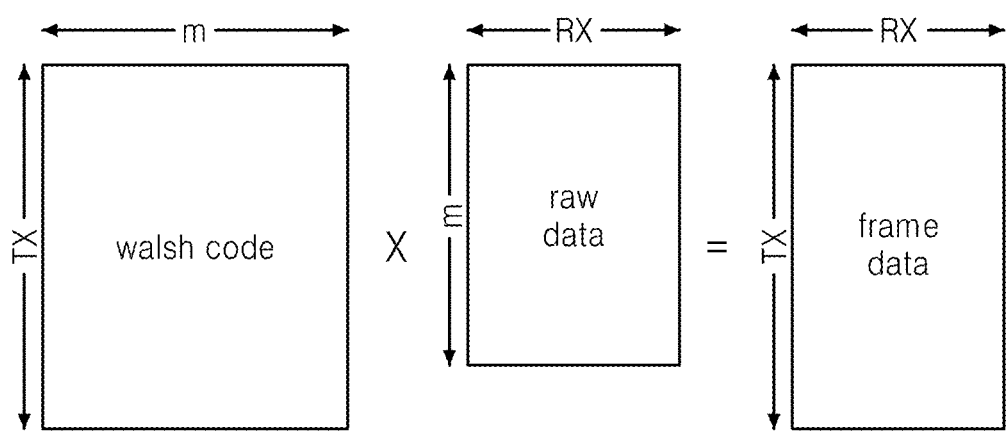
FIG. 16 is a diagram for explaining an operation of the Walsh decoder illustrated in FIG. 15, according to an exemplary embodiment.

FIG. 15 is a block diagram of the Walsh decoder 500, according to an exemplary embodiment. FIG. 16 is a diagram for explaining an operation of the Walsh decoder 500 illustrated in FIG. 15, according to an exemplary embodiment.

When the TSC 30 sends a signal to the touch panel 20, a Walsh code is put in the signal. The AFE 120 of the TSC 30 multiplies data received from the touch panel 20 by the Walsh code to remove noise components and obtain amplified source data. The AFE 120 may perform Walsh encoding. The Walsh encoding, which uses a feature that offsetting occurs when orthogonal signals are multiplied by each other and amplification occurs when in-phase signals are multiplied by each other, is very effective in removing noise.

Referring to FIGS. 15 and 16, the Walsh decoder 500 includes a source buffer 510, a Walsh code register 520, a matrix calculator 530, and a destination buffer 540. The Walsh decoder 500 may perform a matrix calculation on the Walsh code and source data. The Walsh code is originally formed of "1" and "−1", but "−1" is replaced with "0", according to an exemplary embodiment. In order to store "1" and "−1", each element of the Walsh code needs to be composed of two bits including a sign bit. However, since the Walsh code is formed of "1" and "0" in the exemplary embodiment, each element of the Walsh code may be composed of one bit. In an actual matrix calculation, "0" is replaced with "−1". In this way, a Walsh code storage space is reduced by half.

The Walsh decoder 500 may perform a matrix calculation on the Walsh code in a matrix of "the number of row channels, i.e., a row count TX*m" and source data, i.e., raw data in a matrix of "m*the number of column channels, i.e., column count RX" to produce decoding data, i.e., frame data in a matrix of "row count TX*column count RX".

Figure 17:
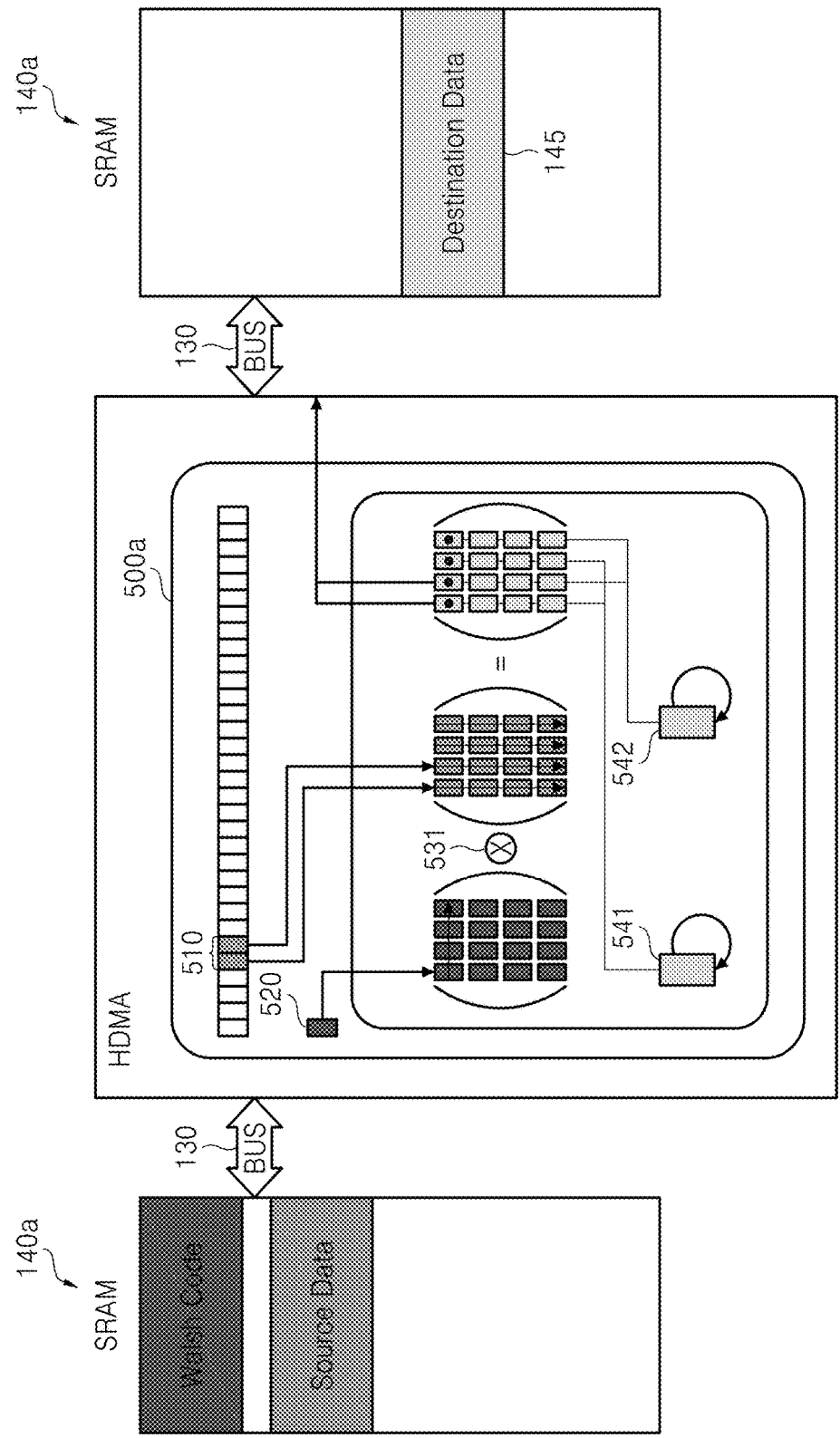
FIG. 17 is a block diagram of an example of the Walsh decoder illustrated in FIG. 15.
Figure 18:
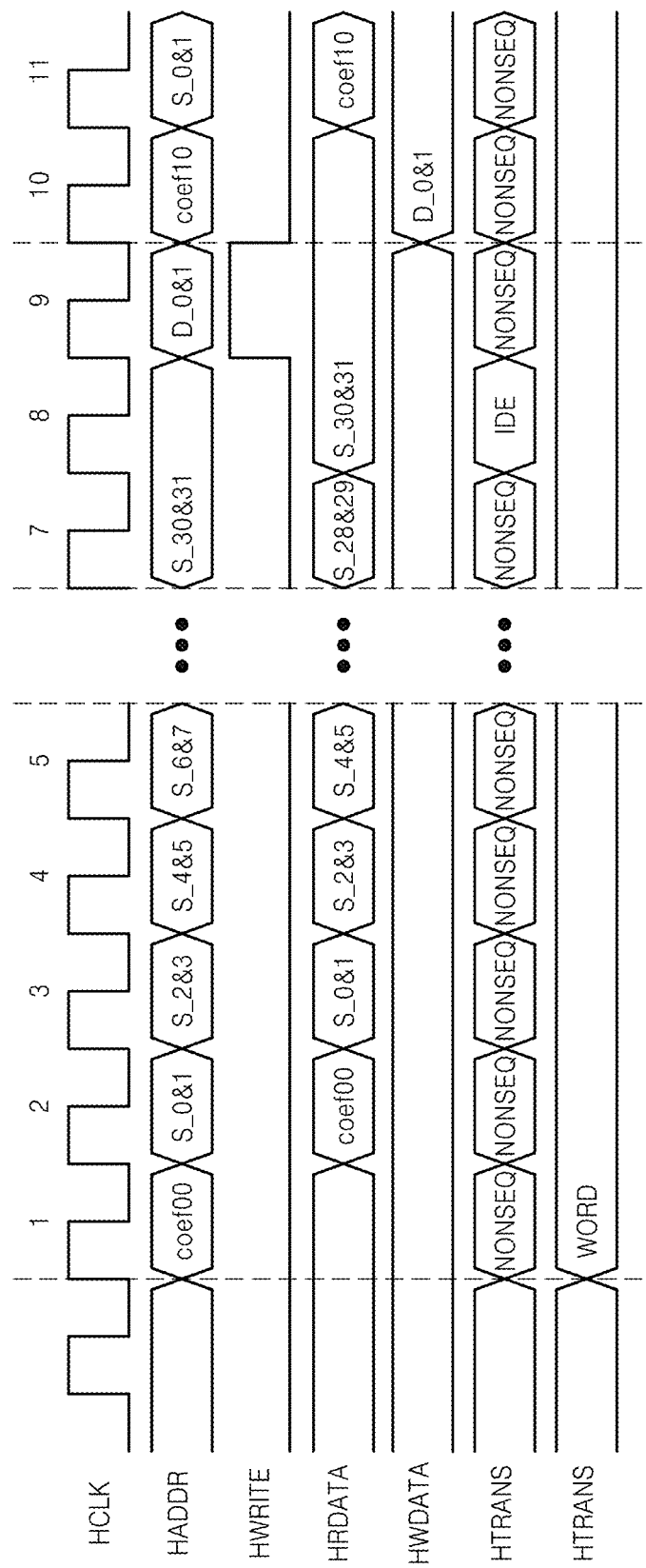
FIG. 18 is a timing chart showing an operation of the Walsh decoder, according to an exemplary embodiments.

FIG. 17 is a block diagram of an example 500a of the Walsh decoder 500 illustrated in FIG. 15, according to an exemplary embodiment. FIG. 18 is a timing chart showing an operation of the Walsh decoder 500a, according to an exemplary embodiment. Referring to FIGS. 17 and 18, the source buffer 510 may be part of the common buffer 190 illustrated in FIG. 3. The Walsh code register 520 may be implemented as a 32-bit register, according to an exemplary embodiment, but the inventive concept is not restricted to the exemplary embodiment.

The matrix calculator 530 may perform an operation on a first matrix of 4*4 and a second matrix of 4*4 to calculate a third matrix of 4*4. The first matrix is formed of values obtained by reading the Walsh code row by row, and the second matrix is formed of values obtained by reading source data column by column. The matrix calculator 530 includes at least two multiplier accumulators (MACs), e.g., a first MAC and a second MAC.

The Walsh code register 520 stores a Walsh code "coeff00" corresponding to a row of the first matrix. The source buffer 510 stores source data S_0 through S_31 corresponding to a column of the second matrix.

The first MAC may perform multiplication and addition on a row of the first matrix and an odd-numbered column of the second matrix data by data to calculate values for entries in the row and the odd-numbered column of the third matrix. The second MAC may perform multiplication and addition on a row of the first matrix and an even-numbered column of the second matrix data by data to calculate values for entries in the row and the even-numbered column of the third matrix. The first and second MACs may operate in parallel. Although two MACs are provided in the exemplary embodiment, the number of MACs may vary with embodiments.

For instance, the first MAC performs multiplication and accumulation on a code in the Walsh code register 520 and data in the source buffer 510 and stores an accumulation result D_0 in a first destination buffer 541. The second MAC performs multiplication and accumulation on a code in the Walsh code register 520 and data in the source buffer 510 and stores an accumulation result D_1 in a second destination buffer 542. Consequently, the first MAC calculates elements in odd-numbered columns of the third matrix and the second MAC calculates elements in even-numbered columns of the third matrix.

When the bus 130 has a 32-bit bandwidth and the first and second MACs are used at the same time, efficiency of the 32-bit bus 130 is maximized. In the exemplary embodiments illustrated in FIGS. 17 and 18, the efficiency of the bus 130 is maximized since two elements in a matrix are simultaneously calculated using the first and second MACs.

<Normalization>

Figure 19:
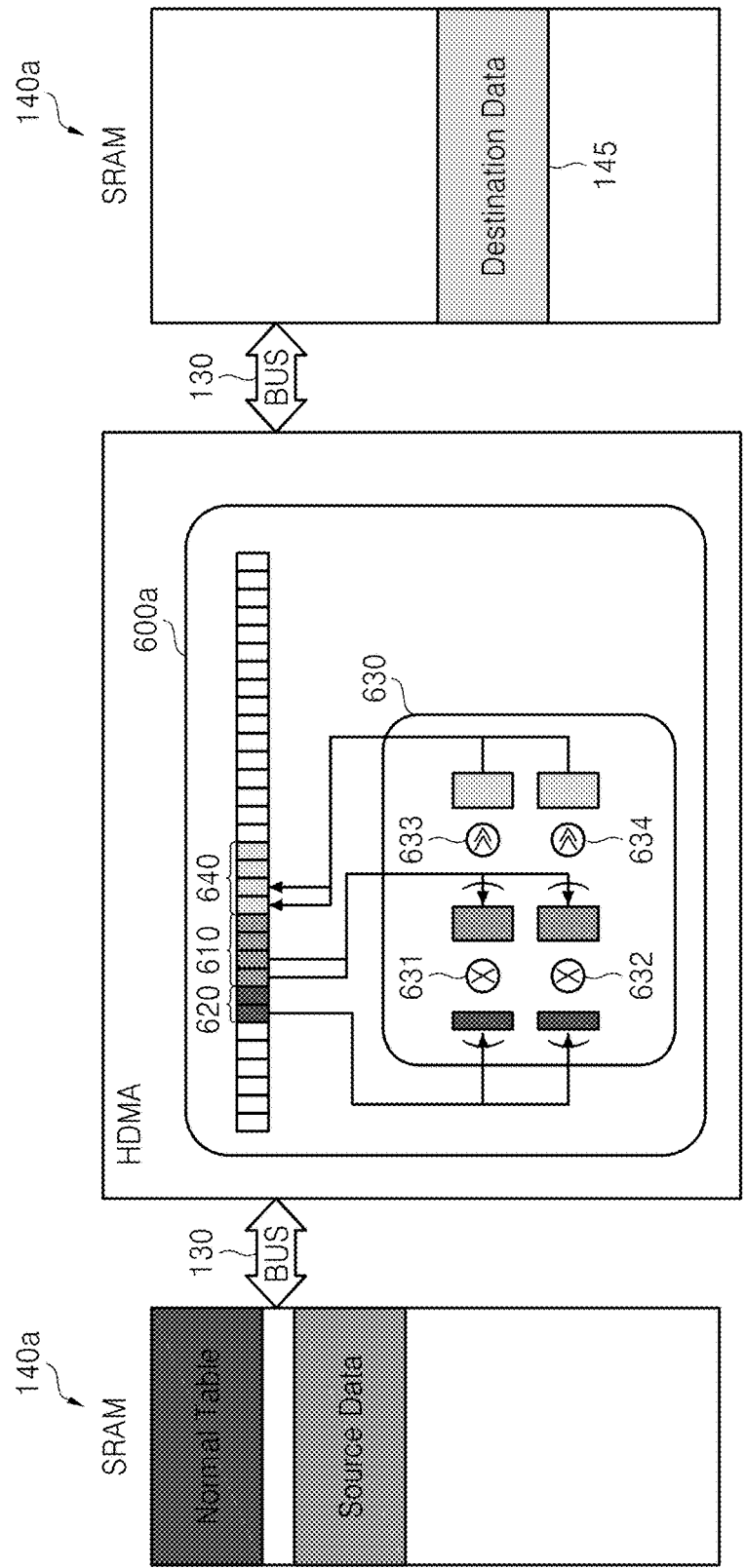
FIG. 19 is a block diagram of a normalization circuit, according to an exemplary embodiment.
Figure 20:
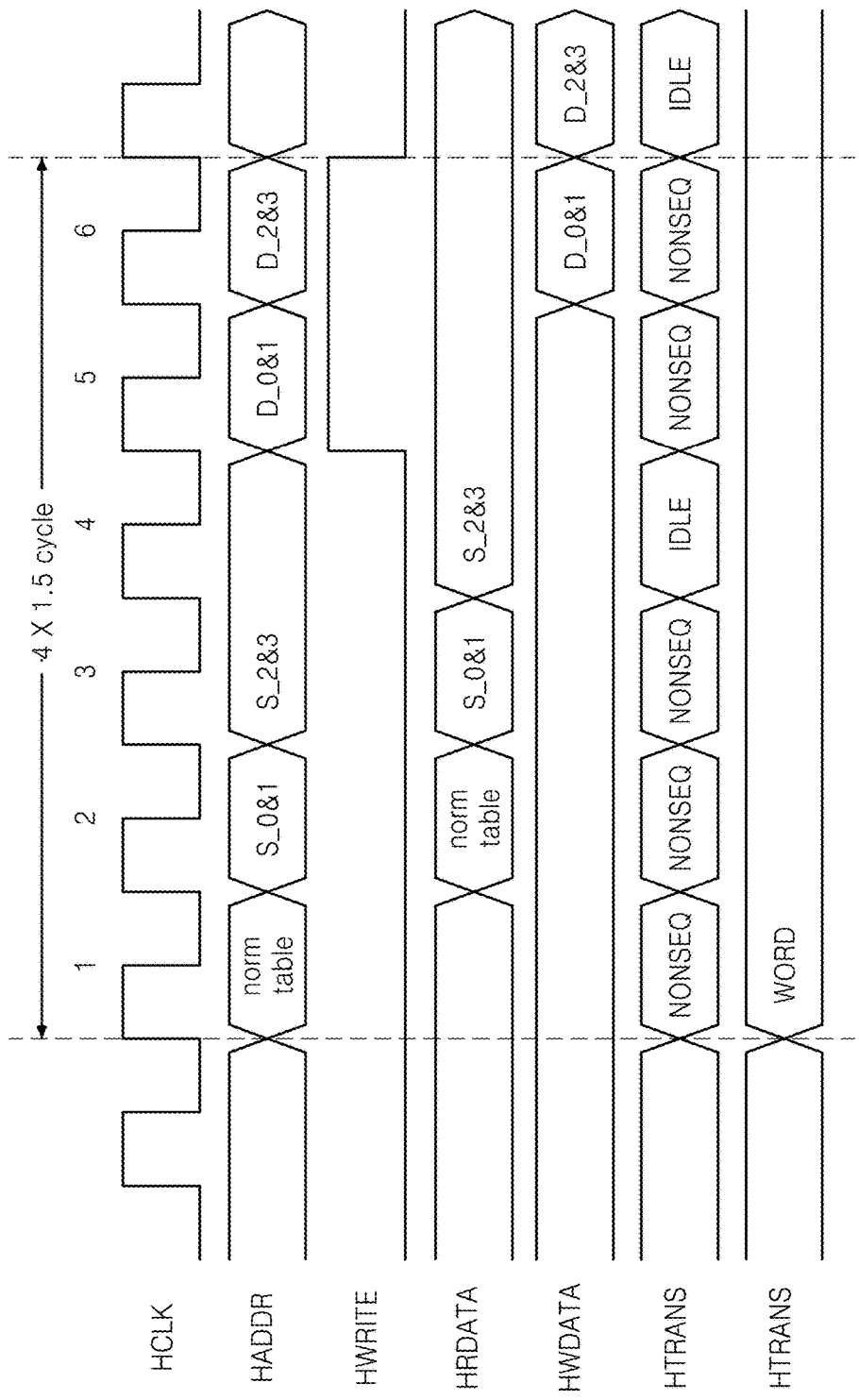
FIG. 20 is a timing chart showing the operation of the normalization circuit illustrated in FIG. 19, according to an exemplary embodiment.

FIG. 19 is a block diagram of a normalization circuit 600a, according to an exemplary embodiment. FIG. 20 is a timing chart showing an operation of the normalization circuit 600a illustrated in FIG. 19, according to an exemplary embodiment. Referring to FIGS. 19 and 20, the normalization circuit 600a corrects an inherent deviation for each channel. For instance, when a conductive rod with a predetermined strength is contacted, each pixel has a different value. The normalization circuit 600a performs correction to uniform the different values of the pixel.

The normalization circuit 600a may include a calculation circuit 630. The calculation circuit 630 may include multipliers 631 and 632 and shifters 633 and 634. The normalization circuit 600a may also include a normalization buffer 620, a source buffer 610, and a destination buffer 640. The normalization buffer 620, the source buffer 610, and the destination buffer 640 may be implemented using part of the common buffer 190 illustrated in FIG. 3.

The normalization buffer 620 receives normalization table data "norm table" from a memory 140a and stores it. The source buffer 610 reads and stores source data S_0 through S_3 from the memory 140a. The normalization table data "norm table" is about one frame and may have eight (8) bits per pixel according to an exemplary embodiment, but the inventive concept is not restricted to the exemplary embodiment.

The multipliers 631 and 632 multiply the normalization table data "norm table" by the source data S_0 through S_3 pixel by pixel. The shifters 633 and 634 may shift output data, respectively, of the multipliers 631 and 632 by a predetermined shift level to produce result data D_0 through D_3. The shift level is information indicating the number of bits by which shift is made. For instance, when the shift level is 2, each of the shifters 633 and 634 shifts the output data of the multiplier 631 or 632 two times to the right. The shift level may be pre-set in the SFR 180 illustrated in FIG. 3.

Referring to FIG. 20, the normalization circuit 600a reads a set of data "norm table" in 1-frame normalization table data from the memory 140a based on the address HADDR and stores the set of data "norm table" in the normalization buffer 620. The normalization circuit 600a also sequentially reads four pixel data S_0&1 and S_2&3 in 1--frame source data from the memory 140a and stores the pixel data S_0&1 and S_2&3 in the source buffer 610. The set of data "norm table" may be 32-bit data.

The first and second multipliers 631 and 632 may operate in parallel. The first and second multipliers 631 and 632 multiply four 8-bit data in the set of data "norm table" by the pixel data S_0&1 and S_2&3, respectively, and shift the multiplication results by the shift level to output result data D_0&1 and D_2&3. In the exemplary embodiment illustrated in FIG. 20, it takes about 4*1.5 cycles to process four pixel data S_0&1 and S_2&3.

<Display Noise Filter>

Figure 21:
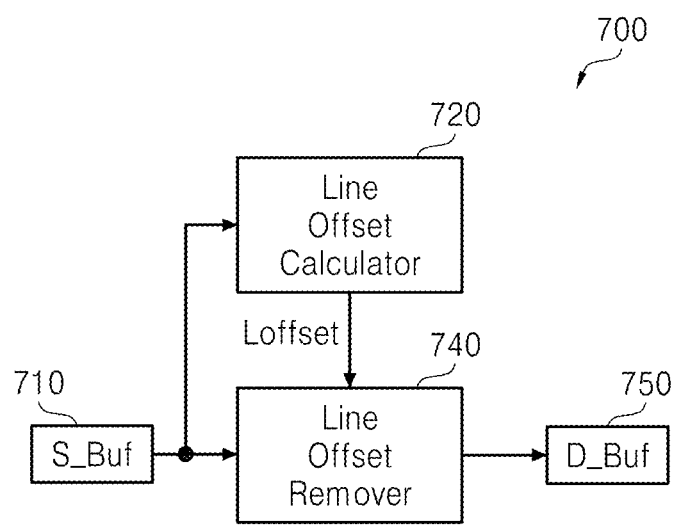
FIG. 21 is a block diagram of a display noise filter, according to an exemplary embodiment.

FIG. 21 is a block diagram of the display noise filter 700, according to an exemplary embodiment. The display noise filter 700 obtains and removes tendency of display noise common to lines (e.g., rows). The display noise filter 700 includes a source buffer 710, a destination buffer 750, a line offset calculator 720, and a line offset remover 740.

The source buffer 710 receives pixel data of each line (e.g., row) from the memory 140 and stores the pixel data. The line offset calculator 720 calculates a line offset (referred to as a "noise mean value") Loffset from the pixel data of a current line. The line offset remover 740 may remove the line offset Loffset from the pixel data. For instance, when the line offset Loffset satisfies a predetermined condition, the line offset remover 740 may subtract the line offset Loffset from the pixel data and output line offset-removed pixel data as result data. The result data may be stored in the destination buffer 750 and then stored in the memory 140. The destination buffer 750 may be the same one as the source buffer 710. At this time, the line offset-removed pixel data may be updated to the source buffer 710. The source buffer 710 may be the common buffer 190 illustrated in FIG. 3.

Figure 22:
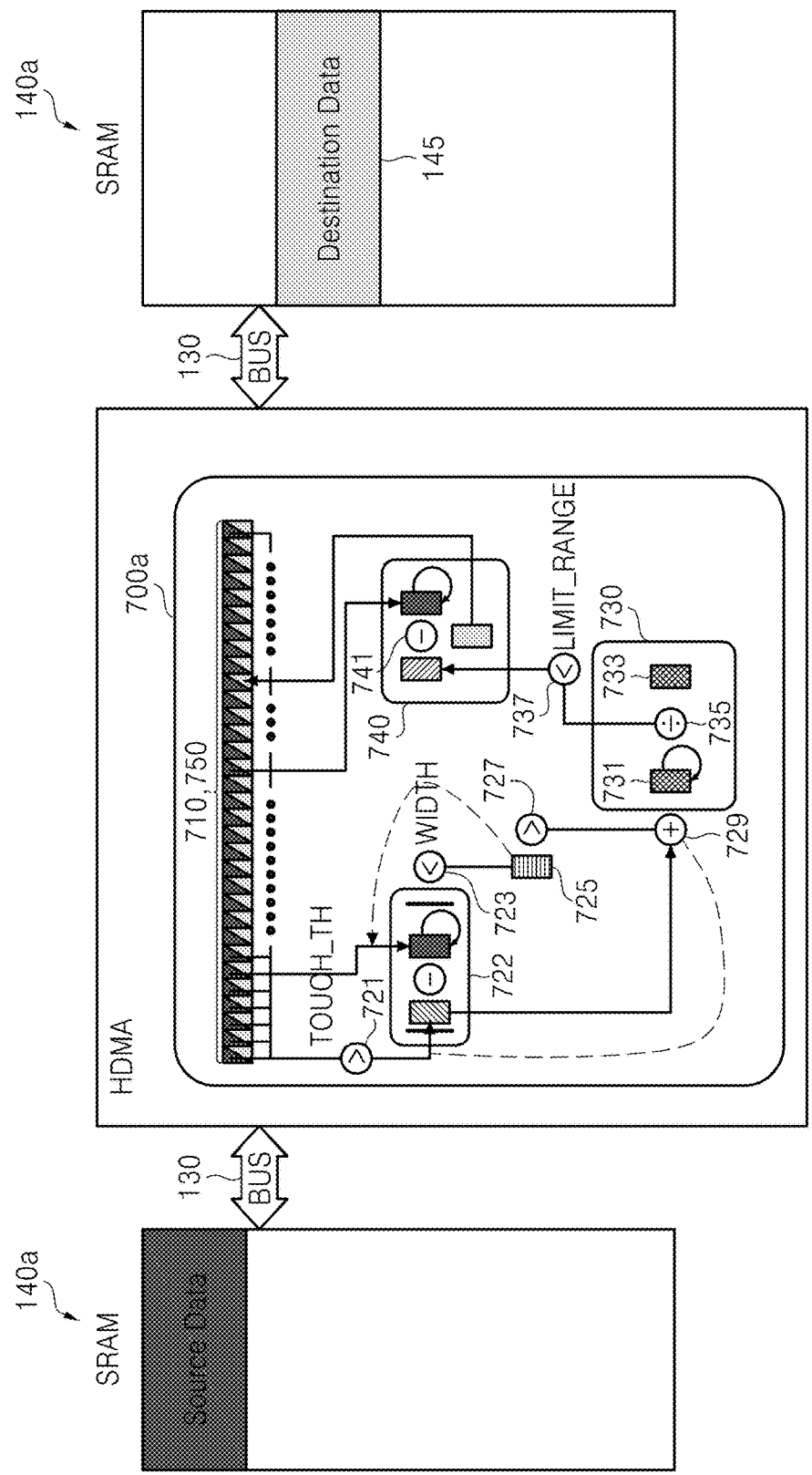
FIG. 22 is a block diagram of a display noise filter, according to an exemplary embodiment.

FIG. 22 is a block diagram of a display noise filter 700a, according to another exemplary embodiment. Referring to FIG. 22, the display noise filter 700a includes a source buffer 710, a destination buffer 750, a plurality of registers, a plurality of comparators 721, 723, 727, and 737, an absolute value calculator 722, a counter, a noise mean value calculator 730, and a mean value remover 740. The plurality of registers may include a width register, a count register, and a limit value register.

The display noise filter 700a may read pixel data corresponding to one row line as source data and may store the source data in the source buffer 710. The number of pixel data corresponding to one row line may be the same as the column count RX.

The absolute value calculator 722 calculates a difference between pixel data exceeding a touch threshold TOUCH_TH among the pixel data of the row line and each of the other pixel data, and produces an absolute value of the difference.

It is assumed that the pixel data corresponding to one row line are first through m-th pixel data. When the first pixel data exceeds the touch threshold TOUCH_TH, the absolute value calculator 722 may sequentially produce the absolute values of differences between the first pixel data and the second through m-th pixel data.

The comparator 727 compares an absolute value output from the absolute value calculator 722 with a setting width WIDTH and increases a history count 725 when the absolute value is less than the setting width WIDTH. When the history count 725 for current pixel data is greater than a setting count CNT, the current pixel data is cumulatively stored in an accumulated value register 729 and an accumulation count 733 is increased by 1.

While such operation is performed on up to m-th pixel data, the history count 725 indicating the number of cases where the absolute value of the difference between pixel data exceeding the touch threshold TOUCH_TH and each of the other pixel data is less than the setting width WIDTH is continuously obtained with respect to each pixel data and current pixel data is accumulated when the history count 725 is greater than the setting count CNT.

The noise mean value calculator 730 divides an accumulated value 731 by the accumulation count 733 to calculate a noise mean value. The mean value remover 740 updates each pixel data with a value obtained by subtracting the noise mean value from the current pixel data when the noise mean value is greater than a limit value LIMIT_RANGE. When the noise mean value is less than the limit value LIMIT_RANGE, the current pixel data is maintained as it is. The pixel data from which the noise mean value has been removed by the mean value remover 740 are stored in the destination buffer 750 and then stored in the memory 140a.

FIG. 23 is a diagram for explaining a procedure in which the display noise filter 700a obtains display noise in one line when there are eight column channels #0 through #7, according to an exemplary embodiment. Referring to FIGS. 22 and 23, differences between source data of each of the column channels #0 through #7 and pixel data of the respective column channels #0 through #7 are obtained and the number of differences in a valid range is counted. This counted value is a history count H_CNT. When the history count H_CNT is greater than the setting count CNT, the current source data is accumulated.

In FIG. 23, history counts H_CNT for the respective column channels #0 through #7 are 4, 4, 5, 5, 4, 1, 1, and 2. When the setting count CNT is 3 and a history count H_CNT is greater than 3, current pixel data is accumulated. Accordingly, pixel data 60, 62, 68, 74, and 80 respectively corresponding to the column channels #0 through #4 are accumulated, so that an accumulated value AC_DAT is 344 and an accumulation count AC_CNT is 5. The accumulated value AC_DAT of 344 is divided by the accumulation count AC_CNT of 5 to calculate a noise mean value, i.e., the line offset Loffset. In other words, the line offset Loffset corresponding to the display noise is obtained. When the line offset Loffset is removed, display noise-removed pixel data are obtained.

Figure 24:
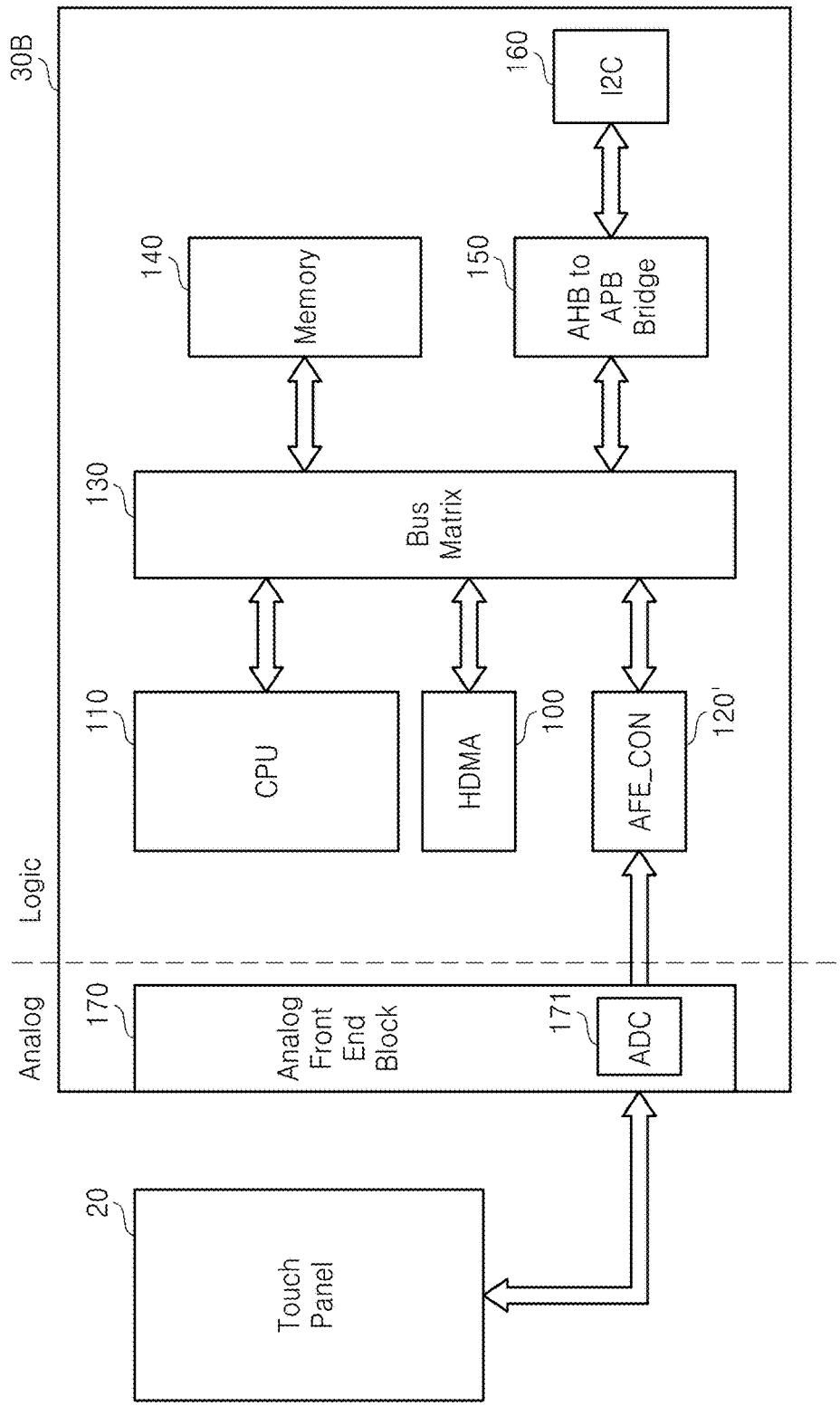
FIG. 24 is a block diagram of a TSC, according to an exemplary embodiment.

FIG. 24 is a block diagram of a TSC 30B, according to an embodiment. The structure and operations of the TSC 30B illustrated in FIG. 24 are similar to those of the TSC 30 illustrated in FIG. 2. Thus, differences between the TSC 30B and the TSC 30 will be described to avoid redundancy.

Referring to FIG. 24, an AFE is divided into an analog part 170 and a digital part (AFE_CON) 120'. The analog part 170 may include an ADC 171. The ADC 171 may be a Q-bit ADC, where Q may be an integer of at least 2 and less than L. The digital part 120' may include an internal memory which stores output data, i.e., digital data of the ADC 171. The digital part 120' may include a memory controller 800 illustrated in FIG. 25.

It is assumed that Q is 11 and the bus 130 has a 32-bit bandwidth according to an exemplary embodiment, but the inventive concept is not restricted to the exemplary embodiment. The digital part 120' may receive 11-bit digital data from the ADC 171 and store the 11-bit digital data in the internal memory. The digital data stored in the internal memory of the digital part 120' may be transmitted to the memory 140 through a bus 840 having a 32-bit bandwidth or to a circuit in the HDMA 100.

Extending the 11-bit digital data to 16-bit data when storing the 11-bit digital data in the memory 140 having a 32-bit bandwidth will increase convenience in data processing. In other words, when each circuit in the HDMA 100 reads and writes data for an algorithm process, data stored in the memory 140 may just be used without additional processing. When the 11-bit digital data needs to be stored as a negative value, one sign bit may be added to a most significant bit (MSB) of the 11-bit digital data and the MSB is copied to create upper four bits, producing 16-bit data.

As described above, when data output from the ADC 171 is extended with more bits and then stored in the internal memory, the convenience in data processing is increased, but the space of the internal memory is wasted. To address this problem, a method of decreasing the size of a physical memory will be described with reference to FIG. 25.

Figure 25:
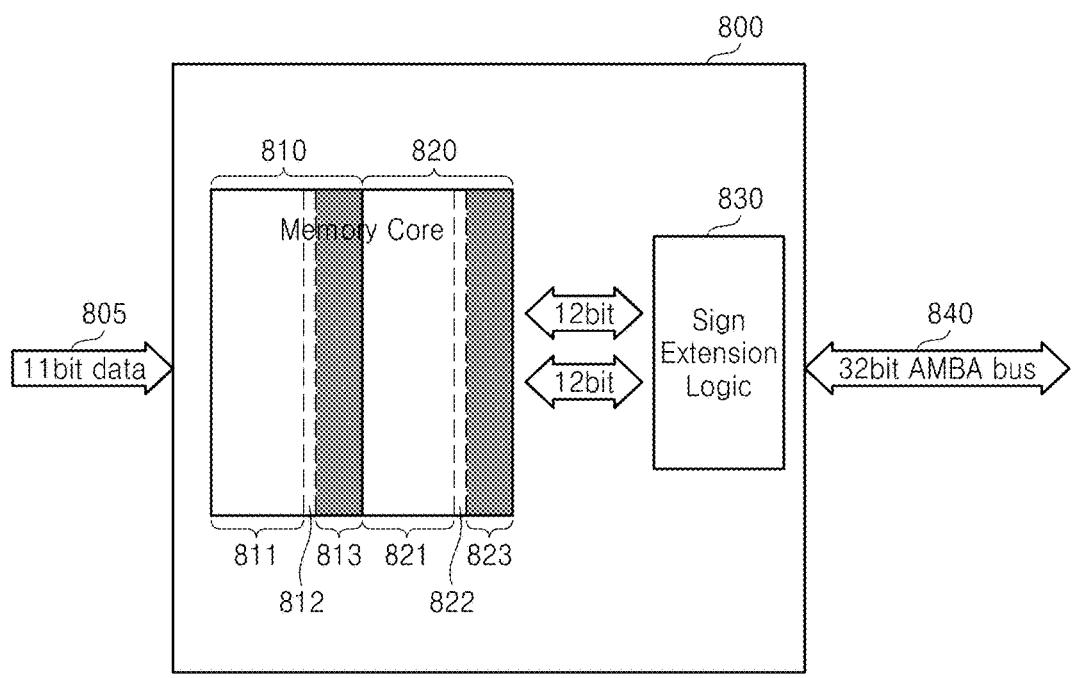
FIG. 25 is a diagram for explaining an operation of a memory controller, according to an exemplary embodiment.

FIG. 25 is a diagram for explaining an operation of the memory controller 800, according to an exemplary embodiment. The memory controller 800 may include memory cores 810 and 820 and a sign extension logic 830. The memory controller 800 may add a sign bit 812 to the MSB of digital data 811 output from the ADC 171 and a sign bit 822 to the MSB of digital data 821 output from the ADC 171 to produce two sets of 12-bit data and may store the two sets of 12-bit data in the memory cores 810 and 820, respectively.

When reading and outputting data from the memory core 810 or 820, the memory controller 800 may add upper four bits to the 12-bit data 811+812 or 821+822 using the sign extension logic 830 and then output 16-bit data to the bus 840. The sign extension logic 830 may copy the sign bit to the upper four bits, thereby converting 12-bit data into 16-bit data.

When writing data to the memory core 810 or 820, the memory controller 800 may remove upper four bits from the data using the sign extension logic 830 and store the 12-bit data 811+812 or 821+822. Accordingly, spaces 813 and 823 for upper four bits are not necessary, so that the size of a physical memory is decreased.

The exemplary embodiments of the inventive concept may be used when data that has been processed by an analog block or a digital block will be stored in a memory and a bit size of the data is less than a bus bandwidth (e.g., 32 bits) or less than a result (e.g., 16 bits) of dividing the bus bandwidth by a natural number (e.g., 2 or 3).

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 1-5, 7, 9, 11, 13, 15, 17, 19, 21, 22, 24 and 25 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

As described above, according to exemplary embodiments of the inventive concept, the data processing speed of a touch screen controller may increase. In other words, data processing time of the touch screen controller may be remarkably reduced, so that a response speed may be increased. As a result, current consumption may be decreased.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A touch screen controller (TSC) comprising:
a front end circuit configured to send a control signal to a touch panel and to receive a touch signal from the touch panel;
an algorithm processing circuit configured to process source data generated based on the touch signal according to a predetermined algorithm;
a memory configured to store the source data and result data obtained as a result of processing the source data at the algorithm processing circuit; and
a bus configured to transfer data among the front end circuit, the algorithm processing circuit, and the memory,
wherein the algorithm processing circuit comprises:
a buffer configured to temporarily store the source data or the result data and shared by at least two circuits; and
a special function register (SFR) configured to store a setting value necessary for an operation of the algorithm processing circuit,
wherein the buffer comprises a source buffer configured to store the source data; and
wherein the algorithm processing circuit is configured to continuously read the source data from the memory during a plurality of cycles of an operating clock signal in a burst mode or a continuous single mode, and to store the source data in the source buffer.

2. The TSC of claim 1, wherein the bus has an R-bit bandwidth; and
wherein the buffer further comprises a destination buffer configured to store the result data.

3. The TSC of claim 2, wherein the algorithm processing circuit reads at least one source data from the memory during one cycle of the operating clock signal.

4. The TSC of claim 2, wherein the destination buffer is the same one as the source buffer and the result data is updated to the source buffer.

5. The TSC of claim 2, wherein offset values for 1-frame data of the touch panel are stored in the memory, and
wherein the algorithm processing circuit further comprises an ambient remover configured:
to sequentially read the source data from the memory in the burst mode or the continuous single mode and store the source data in the source buffer;
to sequentially read offset values from the memory in the burst mode or the continuous single mode and store the offset values in an offset buffer; and
to subtract each one of the offset values in the offset buffer from a corresponding one of the source data in the source buffer and store offset-removed output data in the destination buffer as the result data.

6. The TSC of claim 2, wherein the algorithm processing circuit further comprises a temporal smoothing circuit configured to read "k" frame data from the memory and store the "k" frame data in the source buffer, where "k" is a natural number of at least 2, and
wherein the temporal smoothing circuit comprises at least one of an average calculation circuit configured to calculate an average of pixel data at the same positions in "k" frames and a median filter configured to select a median value from among the pixel data at the same positions in the "k" frames.

7. The TSC of claim 6, wherein the temporal smoothing circuit further comprises a selector configured to select either of output data of the median filter and output data of the average calculation circuit in response to a selection signal, when the temporal smoothing circuit comprises both of the average calculation circuit and the median filter.

8. The TSC of claim 2, wherein the algorithm processing circuit further comprises an energy calculator configured:

to add the source data for each row channel and for each column channel; and to detect a peak signal having a maximum value among the source data and a position of the peak signal.

9. The TSC of claim 8, wherein the energy calculator comprises a row accumulation buffer and a column accumulation buffer; and wherein the energy calculator is configured:

to read the source data from the memory for each row channel and store the source data in the source buffer;

to read column accumulation data from the memory and store the column accumulation data in a column accumulation buffer;

to add the source data stored in the source buffer in units of P pixels and store an addition result in a row accumulation buffer, where P is a natural number; and to add the source data stored in the source buffer and the column accumulation data stored in the column accumulation buffer for each column, update the column accumulation data with an addition result in the column accumulation buffer, and store the updated column accumulation data in the memory.

10. The TSC of claim 9, wherein the energy calculator comprises an energy peak detector configured:

to compare the source data stored in the source buffer with a peak value;

to update the peak value with the source data when the source data is greater than the peak value to detect the peak signal;

to detect the position of the peak signal;

to sequentially compare the source data stored in the source buffer with an energy threshold; and to detect a touch range greater than the energy threshold.

11. The TSC of claim 2, wherein the algorithm processing circuit further comprises a Walsh decoder configured to decode the source data using a Walsh code, and wherein the Walsh decoder is configured:

to read the Walsh code from the memory and store the Walsh code in a code register;

to read the source data from the memory for each column channel and store the source data in the source buffer; and to perform an operation on a first matrix formed of the Walsh code and a second matrix formed of the source data using a matrix calculator to produce a third matrix.

12. The TSC of claim 11, wherein the Walsh code stored in the memory comprises "1" and "0" without a sign bit, and the "0" in the Walsh code is replaced with "-1" during the operation performed using the matrix calculator.

13. The TSC of claim 2, wherein the algorithm processing circuit further comprises a normalization circuit configured to normalize the source data using normalization table data, and wherein the normalization circuit is configured:

to read the normalization table data from the memory and store the normalization table data in a normalization buffer;

to read the source data from the memory and store the source data in the source buffer; and multiply the normalization table data by the source data pixel by pixel, and shift a multiplication result by a predetermined shift level.

14. The TSC of claim 2, wherein the algorithm processing circuit further comprises a display noise filter configured to remove display noise common to row channels, wherein the display noise filter comprises:

a line offset calculator configured to calculate a line offset from source data of a row channel; and a line offset remover configured to subtract the line offset from each of pixel data of the row channel to output line offset-removed source data when the line offset satisfies a predetermined condition.

15. A touch screen controller (TSC) comprising:

a front end circuit configured to send a control signal to a touch panel and to receive a touch signal from the touch panel;

an algorithm processing circuit configured to process source data generated based on the touch signal according to a predetermined algorithm;

a memory configured to store the source data and result data obtained as a result of processing the source data at the algorithm processing circuit; and a bus configured to transfer data among the front end circuit, the algorithm processing circuit, and the memory, wherein the front end circuit comprises:

an analog-to-digital converter to output the source data in a unit of Q-bit, where Q is a natural number of at least 2; and a memory controller configured:

to extend the Q-bit source data to a size of a divisor of a bandwidth of the bus, the divisor being greater than Q and less than or equal to the bandwidth of the bus, by adding a sign bit to a most significant bit of the Q-bit source data one more times; and to output the extended Q-bit source data to the bus.

16. The TSC of claim 15, wherein the memory controller is further configured to remove the added sign bit from the extended Q-bit source data and store the Q-bit source data to the memory for the processing at the algorithm processing circuit.

17. The TSC of claim 16, wherein the memory controller is configured to add the sign bit one or more times from the uppermost bit of the Q-bit source data.

* * * * *